(12) United States Patent
Kim et al.

(10) Patent No.: US 10,446,145 B2
(45) Date of Patent: Oct. 15, 2019

(54) QUESTION AND ANSWER PROCESSING METHOD AND ELECTRONIC DEVICE FOR SUPPORTING THE SAME

(71) Applicant: SAMSUNG ELECTRONICS CO., LTD., Suwon-si, Gyeonggi-do (KR)

(72) Inventors: Dai Yong Kim, Suwon-si (KR); Dong Hyun Yeom, Bucheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/360,050

(22) Filed: Nov. 23, 2016

(65) Prior Publication Data
US 2017/0154626 A1 Jun. 1, 2017

(30) Foreign Application Priority Data

Nov. 27, 2015 (KR) .................. 10-2015-0167100

(51) Int. Cl.
| | |
|---|---|
| *G10L 21/00* | (2013.01) |
| *G10L 15/22* | (2006.01) |
| *G06F 16/332* | (2019.01) |
| *G06K 9/00* | (2006.01) |
| *G10L 13/04* | (2013.01) |
| *G10L 15/26* | (2006.01) |
| *H04N 7/18* | (2006.01) |
| *G10L 13/08* | (2013.01) |

(52) U.S. Cl.
CPC .......... *G10L 15/22* (2013.01); *G06F 16/3329* (2019.01); *G06K 9/00255* (2013.01);
(Continued)

(58) Field of Classification Search
CPC .............................. G01C 21/26; H04M 3/4931
(Continued)

(56) References Cited

U.S. PATENT DOCUMENTS

| | | |
|---|---|---|
| 2007/0136222 A1 | 6/2007 | Horvitz |
| 2008/0086455 A1* | 4/2008 | Meisels ................. G01C 21/26 |

(Continued)

FOREIGN PATENT DOCUMENTS

| | | |
|---|---|---|
| KR | 10-2014-0123369 | 10/2014 |
| WO | 2012/047532 | 4/2012 |

OTHER PUBLICATIONS

Search Report and Written Opinion dated Mar. 7, 2017 in counterpart International Patent Application No. PCT/KR2016/013414.
Supplementary European Search Report dated Jul. 17, 2018 for EP Application No. 16868843.0.

*Primary Examiner* — Huyen X Vo
(74) *Attorney, Agent, or Firm* — Nixon & Vanderhye P.C.

(57) ABSTRACT

An electronic device is provided. The electronic device includes a communication interface comprising communication circuitry and a processor configured to functionally connect with the communication interface, wherein the processor is configured to: obtain a voice signal, obtain context information associated with the user in connection with obtaining the voice signal, determine first response information corresponding to the voice signal, if the context information meets a first condition, determine second response information corresponding to the voice signal, if the context information meets a second condition and send at least part of response information corresponding to the first response information or the second response information to an output device operatively connected with the electronic device or an external electronic device for the electronic device.

13 Claims, 16 Drawing Sheets

(52) U.S. Cl.
CPC .......... *G10L 13/043* (2013.01); *G10L 15/265* (2013.01); *G10L 2013/083* (2013.01); *G10L 2015/227* (2013.01); *G10L 2015/228* (2013.01); *H04N 7/183* (2013.01)

(58) Field of Classification Search
USPC ............ 704/1–10, 230–257, 270.1, 270–277
See application file for complete search history.

(56) References Cited

U.S. PATENT DOCUMENTS

| | | |
|---|---|---|
| 2010/0178956 A1* | 7/2010 | Safadi .................. G10L 15/065 455/563 |
| 2010/0310058 A1 | 12/2010 | Kim |
| 2012/0078938 A1 | 3/2012 | Davis et al. |
| 2012/0209594 A1* | 8/2012 | Agarwal ............. H04M 3/4931 704/9 |
| 2013/0185081 A1 | 7/2013 | Cheyer et al. |
| 2013/0226444 A1* | 8/2013 | Johansson ............ G06F 3/0488 701/300 |
| 2014/0074466 A1 | 3/2014 | Sharifi et al. |
| 2014/0365209 A1 | 12/2014 | Evermann |
| 2015/0162000 A1* | 6/2015 | Di Censo ................ G10L 15/22 704/270.1 |
| 2016/0012475 A1* | 1/2016 | Liu ........................ G06F 3/013 705/14.49 |

\* cited by examiner

QUESTION AND ANSWER PROCESSING METHOD AND ELECTRONIC DEVICE FOR SUPPORTING THE SAME

CROSS-REFERENCE TO RELATED APPLICATION

This application is based on and claims priority under 35 U.S.C. § 119 to a Korean patent application filed on Nov. 27, 2015 in the Korean Intellectual Property Office and assigned Serial number 10-2015-0167100, the disclosure of which is incorporated by reference herein in its entirety.

TECHNICAL FIELD

The present disclosure relates generally to a question and answer (QA) processing method in an electronic device and an apparatus therefor.

BACKGROUND

An electronic device may include a QA system which supports processing answers to user question items. The QA system may receive a command such as s voice or text from a user and may analyze the received user command via a recognition engine. The QA system may extract a keyword suitable for the user command and may extract founded contents corresponding to the extracted keyword.

As the QA system simply outputs a short answer to a command such as a voice or text input from the user, it may output an answer which does not correspond to the intention of the user. For example, since the QA system simply outputs only a specified answer to a user command, there may be a small amount of information to be obtained by the user or accuracy of information to be obtained by the user may be low. Thus, it is difficult to provide efficient and accurate information. Also, since the QA system outputs only a specified answer, answers which do not correspond to user conditions may be provided.

SUMMARY

Aspects of the present disclosure address at least the above-mentioned problems and/or disadvantages and to provide at least the advantages described below. Accordingly, an example aspect of the present disclosure is to provide a QA processing method for allowing a user to more easily recognize and understand an answer based on various output methods and an electronic device for supporting the same.

Accordingly, another example aspect of the present disclosure is to provide a QA processing method for improving accuracy for information to be obtained by a user by providing at least one of an answer and/or additional information and an electronic device for supporting the same.

Accordingly, another example aspect of the present disclosure is to provide a QA processing method for conveniently providing an environment for verifying an answer by providing the answer via various electronic devices based on user conditions and an electronic device for supporting the same.

In accordance with an example aspect of the present disclosure, an electronic device is provided. The electronic device may include a communication interface comprising communication circuitry and a processor configured to functionally connect with the communication circuitry, wherein the processor is configured to obtain a voice signal of a user, to obtain (or verify) context information associated with the user in connection with obtaining the voice signal, to determine first response information corresponding to the voice signal, if the context information meets a first condition, to determine second response information corresponding to the voice signal, if the context information meets a second condition and to send at least part of response information corresponding to the first response information or the second response information to an output device operatively connected with the electronic device or an external electronic device for the electronic device.

In accordance with another example aspect of the present disclosure, an electronic device is provided. The electronic device may include an audio device comprising audio circuitry configured to obtain a voice signal, a memory configured to store a question or an answer associated with the voice signal and a processor operatively connected with the audio device and/or the memory, wherein the processor is configured to convert the obtained voice signal into text, to search for a question corresponding to the converted text or an answer corresponding to the question based on data stored in the memory, to obtain attributes information of the found question or answer, to generate additional information based on the answer and the attributes information and to output at least one of the answer or the additional information.

In accordance with another example aspect of the present disclosure, a question and answer (QA) processing method is provided. The question and answer (QA) processing method may include obtaining a voice signal in the electronic device, converting the obtained voice signal into text, searching for a question corresponding to the converted text or an answer corresponding to the question based on data stored in a memory operatively connected with the electronic device, obtaining attributes information of the found question or answer, generating additional information based on the answer and the attributes information and outputting at least one of the answer or the additional information.

Other aspects and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and advantages of various example embodiments of the present disclosure will be more apparent from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
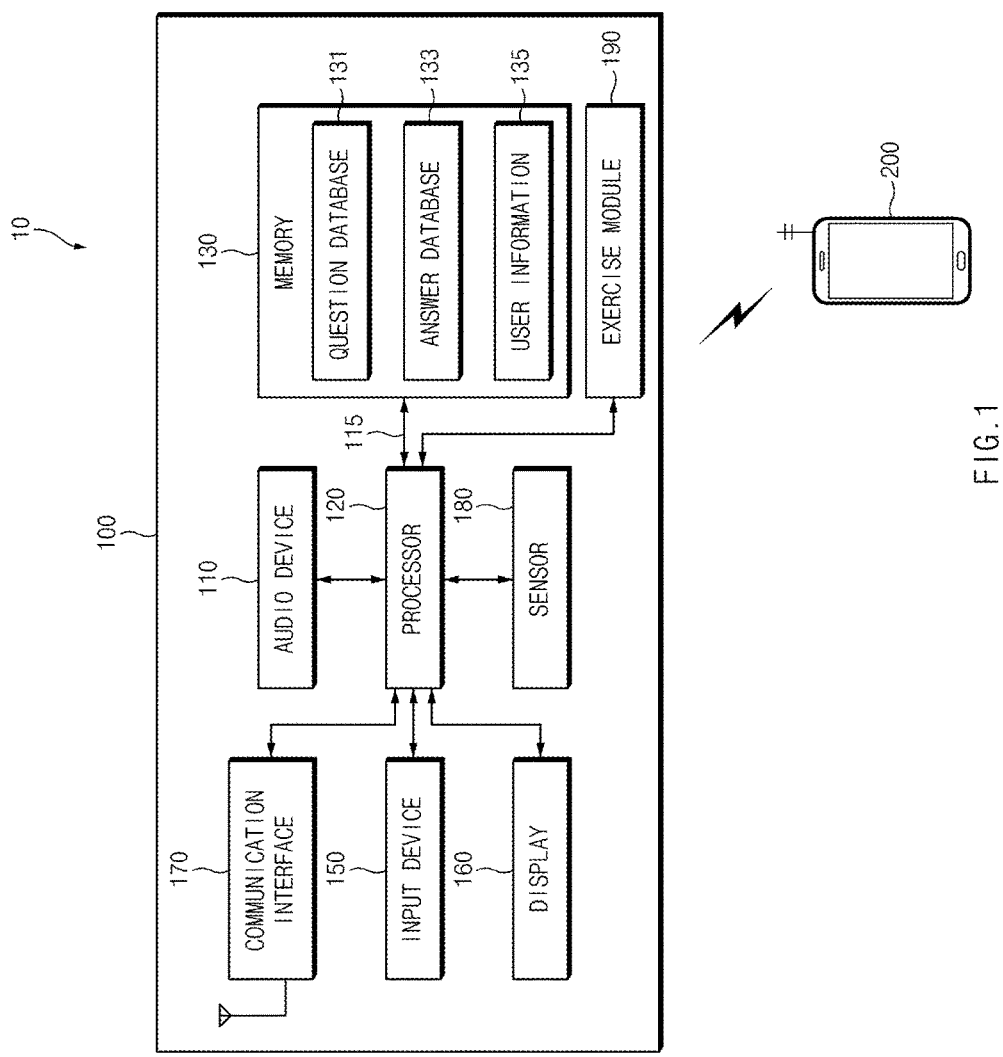
FIG. 1 is a block diagram illustrating an example electronic device operation environment according to various example embodiments.

Various example embodiments of the present disclosure may be described with reference to accompanying drawings. Accordingly, those of ordinary skill in the art will recognize that modifications, equivalents, and/or alternatives of the various example embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various example embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may refer, for example, to a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe various example embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein in various example embodiments of the present disclosure. In some cases, even if terms are terms which are defined in the description, they may not be interpreted to exclude embodiments of the present disclosure.

An electronic device according to various example embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like, but are not limited thereto.

According to another example embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync®, Apple TV®, or Google TV®), game consoles (e.g., Xbox® or PlayStation®), electronic dictionaries, electronic keys, camcorders, electronic picture frames, or the like, but are not limited thereto.

According to another example embodiment, the electronic device may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like), or the like, but are not limited thereto.

According to another example embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof, or the like, but are not limited thereto. An electronic device according to an example embodiment may be a flexible device. Furthermore, an electronic device according to an example embodiment may not be limited to the above-described electronic devices and may include other electronic devices and new electronic devices according to the development of technologies.

Hereinafter, an electronic device according to the various example embodiments may be described with reference to the accompanying drawings. The term "user" used herein may refer to a person who uses an electronic device or may refer to a device (e.g., an artificial intelligence electronic device) that uses an electronic device.

FIG. 1 is a block diagram illustrating an example electronic device operation environment according to various example embodiments.

Referring to FIG. 1, an electronic device operation environment 10 may include, for example, an electronic device 100 and/or at least one external electronic device 200. The electronic device 100 may receive an input, such as, for example, a user command (e.g., text or a voice) and may output an answer in response to analyzing the received command. In this operation, the electronic device 100 may send, for example, the answer or link information (e.g., uniform resource locator (URL) address information, sound quick response (QR) information, or the like) associated with obtaining the answer to the at least one external electronic device 200. The external electronic device 200 may output the response or the link information. The external electronic device 200 may output an answer in response to receiving an input (e.g., a user input) or a control signal of the electronic device 100 (e.g., a signal for requesting the external electronic device 200 to output a response associated with the link information). In connection with outputting the link information, the external electronic device 200 may receive and output the response from another device (e.g., another external electronic device, or a server which may provide the response) based on a communication module embedded therein. According to various example embodiments, the external electronic device 200 may include an audio device which may receive a voice signal. If receiving the voice signal, the external electronic device 200 may send the received voice signal to the electronic device 100.

In various example embodiments, the electronic device 100 may include a processor 120, a memory 130, an input device (e.g., including input circuitry) 150, a communication interface (e.g., including communication circuitry) 170, an output device (e.g., an audio device 110 and/or a display 160), a sensor 180 (e.g., a camera or an image sensor), and a bus 115. Additionally or alternatively, if the electronic device 100 is manufactured in a specified form (e.g., a robot), it may further include an exercise module 190. Also, the memory 130 may include, for example, a question database 131, an answer database 133, and/or user information 135.

The above-mentioned electronic device 100 may collect, for example, a command (e.g., a command of its user) based on the audio device 110, the input device 150, or the communication interface 170 and may output an answer to the collected command. In this operation, the electronic device 100 may collect context information associated with the user and may change a type of an answer to be output, a form of the answer to be output, and/or a device to which the answer will be output, based on the collected context information. The electronic device 100 may output at least one of a short answer or a descriptive answer via at least one specified device (e.g., the electronic device 100 or an external electronic device) based on the collected context information.

The memory 130 may include a volatile and/or nonvolatile memory. The memory 130 may store, for example, a command or data associated with at least another of the components of the electronic device 100. According to an example embodiment, the memory 130 may store software and/or a program (not shown). The program may include, for example, a kernel, a middleware, an application programming interface (API), and/or an least one application program (or "at least one application"), and the like. At least part of the kernel, the middleware, or the API may be referred to as an operating system (OS).

The kernel may control or manage, for example, system resources (e.g., the bus 110, the processor 120, or the memory 130, and the like) used to execute an operation or function implemented in the other programs (e.g., the middleware, the API, or the application program). Also, as the middleware, the API, or the application program accesses a separate component of the electronic device 100, the kernel may provide an interface which may control or manage system resources.

The middleware may play a role as, for example, a go-between such that the API or the application program communicates with the kernel to communicate data.

Also, the middleware may process one or more work requests, received from the application program, in order of priority. For example, the middleware may assign priority which may use system resources (the bus 110, the processor 120, or the memory 130, and the like) of the electronic device 100 to at least one of the at least one application program. For example, the middleware may perform scheduling or load balancing for the one or more work requests by processing the one or more work requests in order of the priority assigned to the at least one of the at least one application program.

The API may be, for example, an interface in which the application program controls a function provided from the kernel or the middleware. For example, the API may include at least one interface or function (e.g., a command) for file control, window control, image processing, or text control, and the like.

The memory 130 may store, for example, an operating system (OS) and the like associated with operating the electronic device 100. Also, the memory 130 may store an analysis program associated with analyzing a user voice and a user command. According to an example embodiment, the memory 130 may store a question database 131 and/or an answer database 133 in connection with supporting a QA service.

The question database 131 may include, for example, data for a variety of short-answer questions or a variety of descriptive questions. In this regard, the question database 131 may include information mapped to questions on at least one short answer. Also, the question database 131 may include information mapped to questions on at least one descriptive answer. In this regard, the question database 131 may be operated in the form of being mapped to the answer database 133.

According to various example embodiments, the question database 131 may include attributes information of questions. The attributes information may include at least one item included in a main classification and at least item included in a subclassification in connection with the items included in the main classification. For example, the question database 131 may include attributes information associated with "economy, politics, sports, game, movie, music, entertainment, life," or the likeas an item of the main classification. Also, the question database 131 may include attributes information associated with subclassifications of each main classification. The attributes information associated with the subclassifications may include subclassifications according to a region-based classification and subclassifications according to a type-based classification. According to an example embodiment, the "economy" corresponding to the item of the main classification may include a region-based subclassification such as "household economy, local economy, or national economy". The "economy" corresponding to the item of the main classification may include a type-based subclassification such as "car, real estate, cash, or bond". According to various example embodiments, a subclassification of the lift which is the item of the main classification may include "food, exercise, study, leisure, health, or the like". The attributes information classified into the above-mentioned main classification or subclassification may vary in form of classification according to a system design scheme, a policy, or the like. For example, attributes information stored in the above-mentioned question database 131 may be used to determine attributes of a question analyzed by a user voice analysis.

The answer database 133 may include, for example, a short answer and/or a descriptive answer to at least one question. The answer database 133 may include short answers mapped to at least one question stored in the question database 131 or descriptive answers mapped to at least one question. The answer database 133 may include attributes information about the short answers or the descriptive answers. The short answers or the descriptive answers may include information similar to attributes information about classifications described in the question database 131. According to various example embodiments, attributes information about an answer/question may include a text length of the answer, information indicating a special letter is included, a category, or combinations thereof.

According to various example embodiments, the descriptive answer may include, for example, a time series answer or a non-time series answer of a length or more. The time series answer may include answers classified into at least one stage. In connection with the time series answer, the answer database 133 may include condition information. The condition information may include conditions for outputting a next-stage answer in the time series answers. According to an example embodiment, the condition information may include sensor information or voice information.

Further, the memory 130 may store, for example, the user information 135. The user information 135 may include information about an age of the user, information indicating whether he or she married, information about his or her job, information about his or her position, information about his or her height, information about his or her weight, information about his or her children, information about his or her favorite food, information about his or her hobby, information about his or her specialty, and/or his or her health information. The above-mentioned user information 135 may be information input by the user. The health information and the like of the user may include information produced based on biometric information collected by the sensor 180.

According to various embodiments, the memory 130 may store sensor information collected by the sensor 180. The stored sensor information may include at least one information associated with activity or a form of the user or an environment around him or her. The sensor information may be used to collect face identification information of the user, his or her operation information (or movement information of the electronic device 100 according to a user operation), his or her height information, information about an object held by him or her, information about an object worn by him or her, information about an object located around him or her, temperature information, humidity information, weather information, or information about a point where he or she is located (e.g., information about his or her home or office and information about a living room, a bathhouse, and a kitchen of his or her home).

The input device 150 may include various input circuitry, for example, at least one device which may generate an input signal on the electronic device 100. The input device 150 may include various input circuitry, such as, for example, and without limitation, at least one button, a joystick, a touch pad, a touch panel, a keyboard, and the like. The input device 150 may generate an input signal associated with turning on or off the electronic device 100, an input signal associated with activating or deactivating a QA service, and the like in response to a user input. According to various example embodiments, the input device 150 may generate an external electronic device selection signal for outputting answer or link information, in response to a user input. In this regard, the electronic device 100 may perform a function of searching the external electronic device 200 and/or a function of outputting a list.

The audio device 100 may include, for example, at least one microphone and/or at least one speaker. The microphone may be used to collect a voice of the user. The microphone may have an always-on state while power is supplied. The microphone may be activated if the user approaches the microphone within a distance, based on analyzing information of the sensor 180. The speaker may be used to output audio information corresponding to the answer.

The display 160 may include, for example, a liquid crystal display (LCD), a light emitting diode (LED) display, an organic LED (OLED) display, a microelectromechanical systems (MEMS) display, or an electronic paper display, or the like, but is not limited thereto. The display 160 may display, for example, a variety of content (e.g., text, images, videos, icons, or symbols, and the like) to the user. The display 160 may include a touch screen, and may receive, for example, touch, gesture, proximity, or a hovering input using an electronic pen or part of a body of the user.

The display 160 may output, for example, information associated with operating the electronic device 100. According to an example embodiment, the display 160 may output at least one menu item and the like associated with operating the electronic device 100. The display 160 may output a list of the at least one found external electronic device 200. The display 160 may output a screen and the like of sending answer or link information to the external electronic device 200.

The communication interface 170 may include various communication circuitry configured to establish communication between, for example, the electronic device 100 and an external device (e.g., an external electronic device 200 or a server). For example, the communication interface 170 may include various communication circuitry to connect to a network through wireless communication or wired communication and may communicate with the external device (e.g., a second external electronic device or a server).

The wireless communication may use, for example, at least one of long term evolution (LTE), LTE-advanced (LIE-A), code division multiple access (CDMA), wideband CDMA (WCDMA), universal mobile telecommunications system (UMTS), wireless broadband (WiBro), or global system for mobile communications (GSM), and the like as a cellular communication protocol. The wireless communication may include, for example, local-area communication. The local-area communication may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 100 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network may include a telecommunications network, for example, at least one of a computer network (e.g., a local area network (LAN) or a wide area network (WAN)), the Internet, or a telephone network.

The communication interface 170 may include various communication circuitry configured to support, for example, a communication function of the electronic device 100. The communication interface 170 may receive a command from the user, and may support a scan function associated with searching the at least one external electronic device 200, a function of establishing a communication channel with the at least one selected external electronic device 200, a function of sending answer or link information to the external electronic device, and the like. According to various example embodiments, the communication interface 170 may receive a user voice signal or a command collected by the external electronic device 200.

In connection with supporting the above-mentioned functions, the communication interface 170 may include communication circuitry such as a short-distance wireless communication module which may establish a communication channel at a short distance with the at least one external electronic device 200. According to various example embodiments, the communication interface 170 may include various communication circuitry configured to perform a function of sending voice analysis information to a server and receiving an answer corresponding to the voice analysis information from the server. The communication interface 170 may include communication circuitry configured to send a voice command to the external electronic device 200 and may receive an answer corresponding to the sent voice command from the external electronic device 200. In connection with performing the above-mentioned function, the communication interface 170 may include various communication circuitry, such as, for example, and without limitation, a mobile communication module, a communication module for supporting Internet communication, or the like.

The sensor 180 may collect, for example, a variety of sensor information associated with the user. The sensor 180 may include an image sensor, a proximity sensor, a tactile sensor, an illumination sensor, a temperature sensor, a humidity sensor, a biometric sensor, an acceleration sensor, a geomagnetic sensor, and the like. According to an example embodiment, the sensor 180 may collect at least one of image information about a face, pupil, or body of the user, image information about clothes or a bag worn by him or her or an object held by him or her, his or her operation information, distance information from him or her, temperature information around him or her, humidity information around him or her, or his or her location information. The sensor information may be provided to verify (or confirm, or ascertain, or identify) context information.

The exercise module 190 may be included in the electronic device 100, if the electronic device 100 has a specified form (e.g., a robot) where it is necessary to move the electronic device 100. The exercise module 190 may be configured to perform a straight-line motion or a curvilinear motion of at least part of the electronic device 100 in a direction. Such exercise module 190 may include at least one gear, spindle, belt, or wheel.

The processor 120 may include one or more of a central processing unit (CPU), an application processor (AP), and/or a communication processor (CP). The processor 120 may execute, for example, calculation or data processing about control and/or communication of at least another of components of the electronic device 100. The above-mentioned processor 120 may analyze a user command and may output at least one of an answer or additional information generated in connection with the answer, based on the analyzed data.

An example embodiment is exemplified as all the components such as the processor 120, the memory 130, the input device 150, the communication interface 170, the output device (e.g., the audio device 110 and/or the display 160), the sensor 180, or the exercise module 190 are included the one electronic device 100. However, various embodiments are not limited thereto. For example, at least part of the processor 120, the memory 130, the input device 150, the communication interface 170, the output device (e.g., the audio device 110 and/or the display 160), the sensor 180, or the exercise module 190 may be divided and implemented in the electronic device 100 and the external electronic device 200 based on a role, a function, or performance of the electronic device 100.

Each of the electronic device 100 and the external electronic device 200 may be the same as or a different device. According to an example embodiment, the server may include a group of one or more servers. According to various example embodiments, all or some of operations executed in the electronic device 100 may be executed in another electronic device or a plurality of electronic devices (e.g., external electronic device 200, or the server). According to an example embodiment, if the electronic device 100 should perform any function or service automatically or according to a request, it may request another device (e.g., external electronic device 200, or the server) to perform at least part of the function or service, rather than executing the function or service for itself or in addition to the function or service. The other electronic device (e.g., external electronic device 200, or the server) may execute the requested function or the added function and may transmit the executed result to the electronic device 100. The electronic device 100 may process the received result without change or additionally and may provide the requested function or service. For this purpose, for example, cloud computing technologies, distributed computing technologies, or client-server computing technologies may be used.

Figure 2:
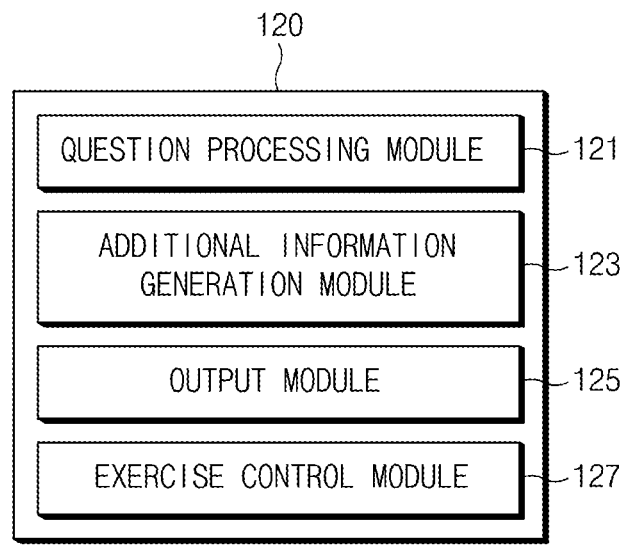
FIG. 2 is a block diagram illustrating an example of a processor according to an example embodiment.

FIG. 2 is a block diagram illustrating an example of a processor according to an example embodiment.

Referring to FIG. 2, a processor 120 according to an embodiment may include a question processing module 121, an additional information generation module 123, an output module 125, and an exercise control module 127. In various embodiments, at least one of the components of the processor 120 may be omitted from the processor 120, or another component may be additionally included in the processor 120. The various modules may be realized in hardware (e.g., circuitry), software, firmware or a combination of these.

The question processing module 121 may collect, for example, a user command signal via an audio device 110 or a communication interface 170 of FIG. 1. In this regard, the question processing module 121 may control activation or deactivation of the audio device 110. When receiving a request to transmit a user command signal from an external electronic device 200 of FIG. 1, the question processing module 121 may receive the user command signal and may analyze the received user command signal. The question processing module 121 may recognize a command for the collected command signal and may convert the command into text. The question processing module 121 may extract important words from the converted text, may analyze the extracted words, postpositions, and the like, and may extract an answer associated with a question. In this regard, the question processing module 121 may use a question database 131 and/or an answer database 133.

According to various example embodiments, the question processing module 121 may omit converting a question received in the form of text via the communication interface 130 into text. According to an example embodiment, the external electronic device 200 may collect a user voice signal, may convert the collected user voice signal into text and may send the text to the electronic device 100. For example, the external electronic device 200 may obtain information of a noise level of an audio signal collected by its microphone. If the noise level is greater than or equal to a specified level, the external electronic device 200 may filter a noise of obtained audio information, may convert the filtered audio information into text, and may send the text to the electronic device 100.

According to various example embodiments, the question processing module 121 may obtain information of a noise level in collected audio information. If a noise level is greater than or equal to a level, the question processing module 121 may output a user interface for entering text. The question processing module 121 may determine a distance between a point where a collected voice signal is spoken and an electronic device 100 of FIG. 1 is greater than or equal to a specified separation distance. If the separation distance is greater than or equal to a specified distance, the question processing module 121 may output a user interface for entering text. According to various example embodiments, the question processing module 121 may identify stored user information and may output a user interface associated with automatically entering text. For example, the question processing module 121 may obtain user information of the external electronic device 200 which establishes a communication channel. If the user of the external electronic device 200 is a user who cannot input a voice command, the question processing module 121 may output a user interface associated with automatically entering text.

According to various example embodiments, the question processing module 121 may determine at least one of attributes information of a question and/or attributes information of an answer using the question database 131 and/or the answer database 133. According to various example embodiments, if there is no data corresponding to an analyzed question in the question database 131 and/or the answer database 133, the question processing module 121 may send the data to a server and may collect answer or link information corresponding to the data, address information of the server, or storage location information stored in the server. The question processing module 121 may collect address information or link information of the electronic device 100 which stores an answer corresponding to the analyzed question.

The question processing module 121 may control activation of a sensor 180 of FIG. 1. For example, if a user command signal is collected, the question processing module 121 may activate the sensor 180 and collect context information. According to an example embodiment, the question processing module 121 may collect face recognition information of the user, distance information (e.g., information about a separation distance between the electronic device 100 and the user), information about a direction observed by his or her face, information about a location where the user is located, or the like.

The additional information generation module 123 may generate, for example, additional information based on attributes information associated with an obtained answer or question. The additional information generation module 123 may collect another information which belongs to a classification (or category) of an obtained answer. If attributes information of an answer is about money, the additional information generation module 123 may generate another answer which belongs to an economy classification, for example, information about conditions of the stock market or conditions of the real estate as additional information. If the attributes information of the answer is about food, the additional information generation module 123 may generate another type of food associated with food found as the answer or a characteristic of the found food as additional information.

According to various example embodiments, the additional information generation module 123 may generate additional information corresponding to a specified condition based on attributes information and context information. For example, if an answer associated with a length is found, the additional information generation module 123 may obtain height information of the user from the context information, and may generate additional information about a correlation between the obtained height information and the length. According to an example embodiment, if a question is about a height of Mount Everest and if an answer to the question is 8848 m, the additional information generation module 123 may generate a relationship (e.g., a rate) between a height of the user and the height of the Mount Everest as additional information. The height of the user may be obtained from previously input user information or may be obtained by analyzing an image of the user, captured by the sensor 180 (e.g., an image sensor).

According to various example embodiments, if a name of a specific person is found as an answer to a question about the specified person, the additional information generation module 123 may generate information about a relationship between the corresponding person and the user (e.g., a person who has the same family name, a person who graduates from the same school, or the like) as additional information. In this operation, if a plurality of persons who have the same family name or graduate from the same school are found, the additional information generation module 123 may select a person having awareness of a level or more, may collect person information about the selected person to generate the collected person information as additional information. For example, the additional information generation module 123 may send a name of a person to a server and may generate person information about a person found the number or more of times among persons found using the corresponding name as additional information.

According to various example embodiments, if a name of a specific electronic device is found as an answer to a question about the electronic device, the additional information generation module 123 may generate a relationship between the found electronic device and an electronic device of the user (e.g., information indicating whether the found electronic device interworks with the electronic device of the user, version information, and the like) as additional information. Alternatively, the additional information generation module 123 may generate a method of using the found electronic device as additional information. The additional information generation module 123 may generate additional information based on price information, size information, and the like of the found electronic device.

According to various example embodiments, the additional information generation module 123 may generate additional information based on answer history. For example, the additional information generation module 123 may manage asked questions and answers to the corresponding questions as history. According to an example embodiment, the electronic device 100 may perform an electronic book (e-book) read function stored in a memory 130 of FIG. 1. In this example, the electronic device 100 may store and manage data about when the user read any e-book. If a request to read a new book occurs, the additional information generation module 123 may generate a description, a picture, or audio information associated with words included in the new book as additional information. For example, the additional information generation module 123 may generate an image which is associated with a specific word included in the new book and is included in a book having previously read history as additional information.

According to various example embodiments, the additional information generation module 123 may classify user information according to users and may store and manage the classified user information, in connection with answer history. For example, the additional information generation module 123 may collect user information for each family member (e.g., personal information for each user, audio feature information for distinguishing a speaker, preference information, information about an electronic device which is being operated for each user, and the like). The additional information generation module 123 may classify answer history according to users and may store and manage the classified answer history, while providing questions asked for each user and answers to the corresponding questions.

When an answer to a question of a specific user is selected, the additional information generation module 123 may generate additional information in a different way based on a grade (or a relationship, a location, and the like) of the corresponding user. For example, the additional information generation module 123 may generate additional information associated with a question and answer of a father or a mother among family members and additional information associated with a question and answer of a son or a daughter in a different way and may output the generated additional information. According to an example embodiment, if a schoolchild asks about a tomorrow schedule, an answer may be school attendance, and the additional information generation module 123 may generate a class schedule table as additional information. If a mother who has a schoolchild asks about a tomorrow schedule, an answer may be the same school attendance as an answer of the schoolchild, the additional information generation module 123 may generate additional information including a class schedule table of the schoolchild and a schedule table associated with traffic guidance.

According to various example embodiments, when generating additional information associated with exercise, the additional information generation module 123 may provide differentiated information based on user information. The additional information generation module 123 may generate additional information in which a form of exercise to be performed or a goal amount of exercise is set in a different way, based on user information. For example, if receiving a question item about a yoga posture, the electronic device 100 may output an answer about various yoga postures (e.g., at least one of text information, audio information, or image information). The additional information generation module 123 may provide a relatively easy yoga posture or a relatively difficult yoga posture as additional information based on user information. The additional information generation module 123 may provide different yoga postures as additional information based on exercise history for each user, an amount of usual exercise, and the like.

According to various example embodiments, when generating additional information associated with exercise, the additional information generation module 123 may generate the additional information based on answer history. For example, when new exercise is performed, the additional information generation module 123 may obtain previously performed exercise history (e.g., obtained through answer history) and may generate additional information to refer to a similar exercise posture or operation in connection with a new exercise posture or operation. In this regard, the additional information generation module 123 may extract a feature point for the new exercise posture or operation and may search for history of an exercise posture or operation having a matching rate of a specified level or more. If there are a plurality of found information, the additional information generation module 123 may first provide an exercise posture or operation with a high matching rate or may provide all of found information in the form of a multi-view.

According to various example embodiments, the additional information generation module 123 may provide additional information for each stage in connection with exercise information. For example, if a question about exercise occurs, the electronic device 100 may output a text description or image associated with various exercise types as an answer. When providing information about various types of exercise (e.g., a push-up, sit-up, a chin-up, and the like), the additional information generation module 123 may generate a relatively easy or difficult type of exercise or an amount of the exercise as additional information and may provide the additional information, based on user information (e.g., a body condition of the user, an amount of usual exercise, and the like).

According to various example embodiments, the additional information generation module 123 may configure analects based on expressions frequently used by the user and may generate additional information based on the analects. For example, if generating the additional information, the additional information generation module 123 may replace words having the same meaning among words included in the additional information with words included in the analects of the user. Thus, the additional information generation module 123 may support describing information using words or expressions which are more familiar to the user.

According to various example embodiments, when referring to information associated with generating additional information, the additional information generation module 123 may use a database stored in at least one external electronic device. For example, if a word (or sentence) associated with generating additional information is found, the additional information generation module 123 may send the corresponding word to at least one external electronic device and may collect information associated with the corresponding word from the external electronic device. The additional information generation module 123 may send attributes information associated with a question or answer to the external electronic device and may collect information corresponding to the attributes information among information stored in the external electronic device.

The additional information generation module 123 may select a specified external electronic device based on attributes information of a question or answer and may share a database of the selected external electronic device. For example, the additional information generation module 123 may share a database stored in a memory of at least one of external electronic devices, such as a refrigerator, a washing machine, a microwave, a television (TV), an audio device, a projector, and a desktop computer, or the like, which are connected or may be connected over a communication channel. In this regard, the electronic device 100 may store and manage a mapping list of mapping at least one external electronic device for each attributes information. The additional information generation module 123 may generate additional information based on the collected information or the shared database.

The output module 125 may output, for example, an answer to a question to a specified device (e.g., the external electronic device 200). The output module 125 may convert a found answer into a voice signal and may output the converted audio signal via an audio device 110 of FIG. 1. The output module 125 may output the found answer via an audio device of the external electronic device 200. According to an example embodiment, if there is the external electronic device 200 within a distance with respect to a location where the user is arranged, the output module 125 may control the external electronic device 200 to output an answer via the corresponding external electronic device 200. When outputting the answer, the output module 125 may output the answer (e.g., output the answer as audio information or screen information) to a plurality of specified devices (e.g., the at least one external electronic device 200).

According to various example embodiments, the output module 125 may change a form of an answer to be output, based on a characteristic of the answer to a question. For example, if a found answer is a short answer, the output module 125 may convert the answer into a voice signal and may output the converted audio signal over the audio device 110. If the found answer is a descriptive answer, the output module 125 may output the answer as screen information (for this purpose, convert the voice signal into text and output the text), while converting the corresponding answer into a voice signal and outputting the voice signal. Also, the output module 125 may determine whether a specified condition is met, based on a characteristic of an answer to a question. If the specified answer is met, the output module 125 may output the corresponding answer to a specified device (e.g., the external electronic device 200). If a time series answer is found, the output module 125 may output part of the answer. If a specified condition (e.g., a condition in which specified context information is obtained) is met, the output module 125 may output next answers.

According to various example embodiments, if an answer including an image or a formula is found, the output module 125 may output screen information on a device (e.g., the electronic device 100 or the at least one electronic device 200). In this case, the output module 125 may output audio information of providing that the answer is output as the screen information. The output module 125 may output audio information of providing notification that the answer is output to any device (e.g., the specific external electronic device 200).

According to various example embodiments, the output module 125 may perform output retry based on a monitored result. For example, the output module 125 may analyze audio information collected via a microphone of the electronic device 100 and may determine that audio information of a specified form is collected. If the audio information of the specified form is not collected and if a specified time elapses, the output module 125 may output previously output information again. According to an example embodiment, the output module 125 may classify and output a specified song at intervals. The output module 125 may output the song during a first interval and may collect audio information spoken by the user. If a form of the audio information is identical to the specified form, the output module 125 may output the song during a next second interval. According to various example embodiments, the output module 125 may apply comparison criteria for audio information collected for each user information in a different way. For example, the output module 125 may apply a condition of a specified form in a different way based on a song career of the user (e.g., obtained by a user input), previous singing history (e.g., score history for each song), or the like. If the song career of or the previous singing history is relatively fewer, the output module 125 may provide a relatively lower (or weaker) condition. Thus, although the user sings relatively badly (e.g., although there is many times a beat or pitch is wrong), the output module 125 may pass a current interval and may output a next interval.

According to various example embodiments, the electronic device 100 (e.g., the question processing module 121 of the processor 120) may receive a question in connection with a game using assembly blocks and may obtain an assembly method for each stage as an answer in response to the question. The output module 125 may analyze an image for a form of assembling assembly blocks and may determine whether a current stage is any assembly stage based on the analyzed image. The output module 125 may output an assembly description of a next stage for each assembly stage (e.g., a description of a form of necessary blocks, the number of the necessary blocks, and a location where the blocks should be arranged).

According to various example embodiments, the output module 125 may perform classification for each user based on a collected voice command. The output module 125 may output a timbre, a tone, a tempo, and the like of information to be output for each user in a different way. For example, if the user is a child, the output module 125 may output an answer or additional information using a voice of a relatively sonorous tone or at a relatively slow speed.

According to various example embodiments, the output module 125 may change a type of an external electronic device for outputting an answer or additional information, based on the user which inputs a question. For example, the output module 125 may send an answer or additional information to an electronic device used by the user who inputs a question. In this regard, the output module 125 may search for a currently connected user electronic device or may connect a communication channel with an electronic device registered in connection with the user (e.g., perform pairing). If a plurality of electronic devices are registered in connection with the user who input a question, the output module 125 may send an answer or additional information to an electronic device registered as a wearable device.

According to various example embodiments, the output module 125 may collect user information or information used to generate additional information from a memory of the connected electronic device. The output module 125 may output an answer or additional information based on a voice. If information such as an image or a formula is included in the answer or additional information, the output module 125 may send the corresponding answer to an electronic device associated with the user.

The exercise control module 127 may control, for example, an exercise function of the electronic device 100. If a direction in which a voice signal of the user is collected is detected based on a plurality of microphones, the exercise control module 127 may control (e.g., rotate or move) the electronic device 100 such that a face of the electronic device 100 (e.g., a region where a display 160 is arranged or a region where the sensor 180 (e.g., a camera or an image sensor) is arranged) looks at the direction in which the voice signal of the user is collected. If a voice signal of the user is of a level or less, the exercise control module 127 may control the electronic device 100 such that the electronic device 100 moves to a point at which the voice signal of the user is spoken. The exercise control module 127 may be moved in a form on the user to capture an activity state of the user. The exercise control module 127 may be moved to a location where an image of a specified image is capture, based on a plurality of images collected at various angles.

According to various example embodiments, at least some of the question processing module 121, the additional information generation module 123, the output module 125, and the exercise control module 127 may be implemented with software, firmware, hardware, or at least two or more combinations thereof. At least some of the question processing module 121, the additional information generation module 123, the output module 125, and the exercise control module 127 may be implemented (e.g., executed) by a processor (e.g., the processor 120). At least some of the question processing module 121, the additional information generation module 123, the output module 125, and the exercise control module 127 may include, for example, a module (e.g., including circuitry), a program, a routine, sets of instructions, a process, or the like for performing one or more functions.

According to various example embodiments, the present disclosure may provide an electronic device. The electronic device may include a communication interface comprising communication circuitry and a processor configured to functionally connect with the communication interface, wherein the processor is configured to: obtain a voice signal of a user, obtain context information associated with the user in connection with obtaining the voice signal, determine first response information corresponding to the voice signal, if the context information meets a first condition, determine second response information corresponding to the voice signal, if the context information meets a second condition and send at least part of response information corresponding to the first response information or the second response information to an output device operatively connected with the electronic device or an external electronic device for the electronic device.

According to various example embodiments, the electronic device may further include a microphone, wherein the processor is configured to receive the voice signal from the user using the microphone.

According to various example embodiments, the processor is configured to receive the voice signal from the external electronic device or another external electronic device via the communication circuitry.

According to various example embodiments, the electronic device may further include an image sensor or camera configured to obtain an image associated with the user, wherein the processor is configured to obtain the context information further based on the image.

According to various example embodiments, the processor is configured to obtain attributes information to distinguish kinds or category, or contents of the response information and provide the answer information using a method different from a method for providing the answer information, if the attributes information meets a condition.

According to various example embodiments, the method may include a method for providing the answer information through a sound, and wherein the processor is configured to provide the answer information as an image or text, if the attributes information meets the condition.

According to various example embodiments, the attributes information comprises a text length of the answer information, information indicating whether a special letter is included, a category, or combinations thereof, and wherein the processor is configured to generate information corresponding to the condition based on at least part of the attributes information.

According to various example embodiments, the present disclosure may provide an electronic device. The electronic device may include an audio device configured to obtain a voice signal, a memory configured to store a question or an answer associated with the voice signal and a processor configured to operatively connect with the audio device or the memory, wherein the processor is configured to: convert the obtained voice signal into text, search for a question corresponding to the converted text or an answer corresponding to the question based on data stored in the memory, obtain attributes information of the found question or answer, generate additional information based on the answer and the attributes information and output at least one of the answer or the additional information.

According to various example embodiments, the electronic device may further include a sensor configured to obtain an image, wherein the processor is configured to obtain an image (e.g., a peripheral image) using the sensor and output at least one of the answer or the additional information, if a result of analyzing the obtained image meets a condition.

According to various example embodiments, the processor is configured to convert the additional information into a voice signal and output the converted voice signal.

According to various example embodiments, the processor is configured to output information which is not converted into a voice signal in the additional information on a screen of a device.

According to various example embodiments, the processor is configured to output address information corresponding to a storage location at which the additional information is stored, on a screen of a device.

According to various example embodiments, the processor is configured to output at least part of the answer and wait for outputting next part of the answer until a condition is met.

According to various example embodiments, the processor is configured to output next part of the output answer in the answer, if the condition is met and output an answer to another question, if the other answer is received before the condition is met.

Figure 3:
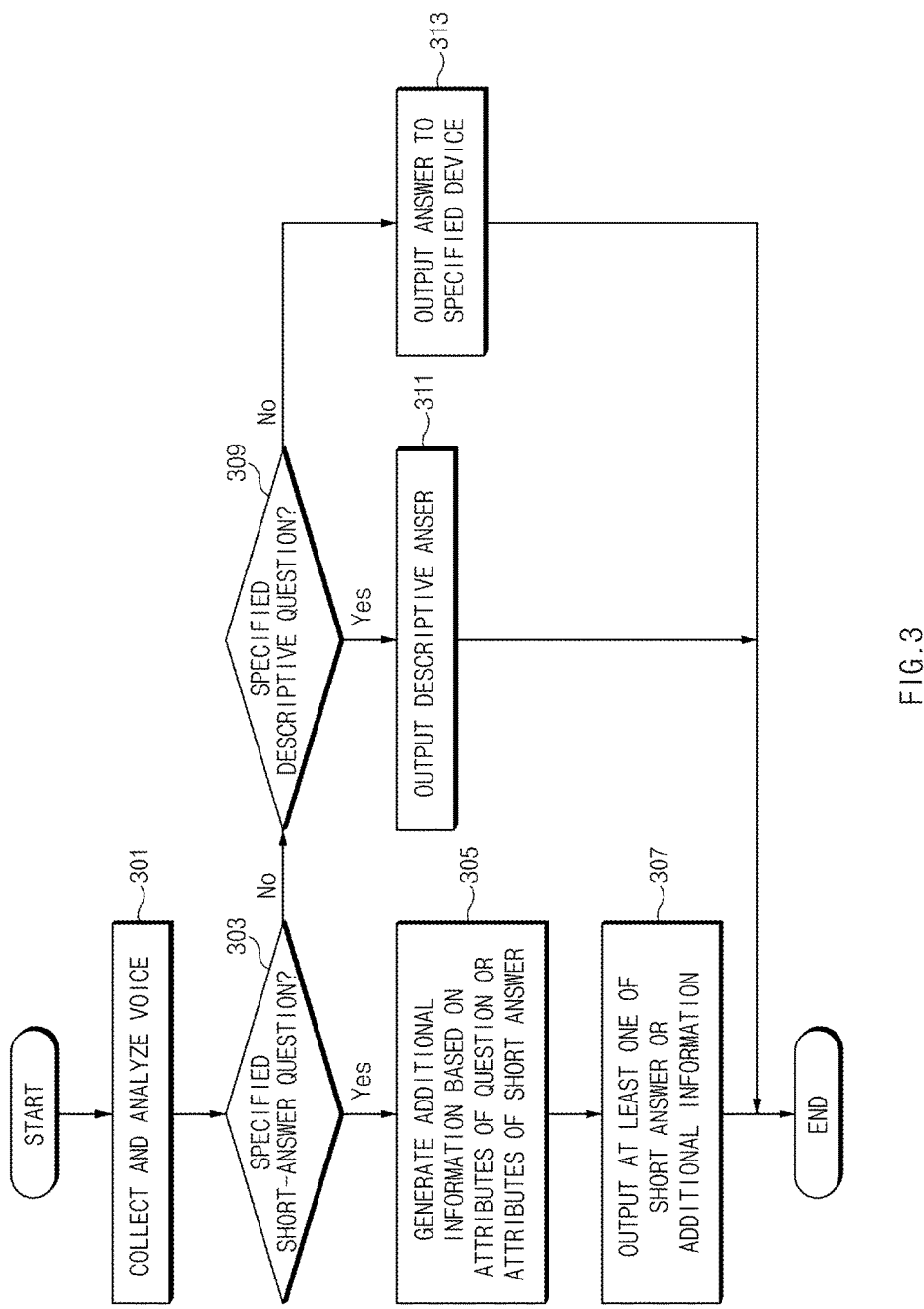
FIG. 3 is a flowchart illustrating an example of a QA processing method according to an example embodiment.

FIG. 3 is a flowchart illustrating an example of a QA processing method according to an example embodiment.

Referring to FIG. 3, in connection with the QA processing method according to an example embodiment, in operation 301, a processor 120 (e.g., a question processing module 121) of FIG. 2 may collect and analyze a voice. For example, the processor 120 may activate an audio device 110 of FIG. 1 to collect a user voice signal. The processor 120 may receive a user command signal from a specified external electronic device 200 of FIG. 1 via a communication interface 170 of FIG. 1. If an input is a voice, the processor 120 may convert the voice into text based on a voice recognition function. In this regard, the electronic device 100 of FIG. 1 may include a voice recognition program and a voice recognition database. The processor 120 may extract a subject, an object, a predicate, and the like from the converted text and may compose a sentence using the extracted information. The processor 120 may extract words from the converted text. The processor 120 may search for a response corresponding to the sentence configured based on the text or the extracted words. In this regard, the processor 120 may search a question database 131 and an answer database 133 of FIG. 1 for an answer corresponding to an extracted question. According to various example embodiments, if there is no data corresponding to a question in the question database 131, the processor 120 may send an extracted question to an external server via the communication interface 170 and may receive an answer corresponding to the question from the external server.

In operation 303, the processor 120 (e.g., the question processing module 121) may determine whether the analyzed result is a specified short-answer question. In this regard, as described above, the processor 120 may obtain information of a length of an answer using the question database 131. If the text length of the answer is within a specified length (e.g., if the answer is configured with one word, if the answer is a compound word having one word meaning, or if the text length of the answer is within 10 letters), the processor 120 may determine the analyzed result as the specified short-answer question.

If the analyzed result is the specified short-answer question, in operation 305, the processor 120 (e.g., an additional information generation module 123 of FIG. 2) may generate additional information based on attributes of a question or attributes of a short answer. For example, the processor 120 may collect attributes information about a question or an answer based on the question database 131 or the answer database 133. The processor 120 may collect information associated with the same attributes information (e.g., a main classification or a subclassification) as the collected attributes information as additional information. For example, the processor 120 may generate a news article, user search history information, and the like which belong to the same classification as the attribute information as additional information.

According to various example embodiments, the processor 120 may collect context information and may generate additional information which includes the collected context information and the attributes information in common. For example, if a question associated with a location or a place name is received, the processor 120 may collect current location information as context information. The processor 120 may generate additional information associated with a current location (e.g., news associated with the current location, building or place name information corresponding to the current location, and the like). The processor 120 may compare the answer with the context information and may generate additional information corresponding to the compared result. For example, if a question associated with a height, a length, or an area is received, the processor 120 may collect user information as context information. The processor 120 may compare the user information with question or answer information and may generate the compared result as additional information.

In operation 307, the processor 120 (e.g., an output module 125 of FIG. 2) may output at least one of a short answer or additional information. For example, the processor 120 may generate a voice signal corresponding to the short answer and may output the generated voice signal. The processor 120 may output a short answer, may convert additional information into a voice signal, and may output the voice signal corresponding to the additional information. According to various example embodiments, after outputting a short answer, if a specified condition is met, the processor 120 may output additional information. After outputting a short answer, if a user gesture for requesting to output additional information occurs, the processor 120 may output additional information.

If the analyzed result is not the specified short-answer question, in operation 309, the processor 120 (e.g., the question processing module 121) may determine whether the analyzed result is a specified descriptive question. For example, if a length of an answer corresponding to a question is greater than or equal to a specified length, if the answer is configured with a plurality of sentences, or if the answer includes a specified number or more of words, the processor 120 may determine the analyzed result as a descriptive question for a descriptive answer.

If the analyzed result is the specified descriptive question, in operation 311, the processor 120 (e.g., the output module 125) may obtain and output a descriptive answer using a database or a server. The processor 120 may convert the descriptive answer into a voice signal and may output the voice signal via an audio device 110 of FIG. 1. The processor 120 may search the at least one external electronic device 200 and may send a voice signal a device having voice signal output history or a device according to user selection among the at least one found external electronic device 200. According to various example embodiments, the processor 120 may generate additional information about a descriptive answer and may selectively output the generated additional information. When generating the additional information about the descriptive answer, the processor 120 may generate the additional information based on attributes information stored in the question database 131 or the answer database 133. The processor 120 may collect context information using a sensor 180 and the like of FIG. 1 and may generate additional information based on the collected context information and attribute information.

If the analyzed result is not the specified descriptive question, in operation 313, the processor 120 may collect an answer associated with the corresponding question in a specified manner and may output the answer to a specified device (e.g., the external electronic device 200). For example, if the answer includes an image, a formula, or the like, the processor 120 may configure a screen including the image or the formula. The processor 120 may output the screen on the display 160 or may send the screen to the at least one external electronic device 200 which may connect with the electronic device 100 via the communication interface 170. According to various example embodiments, if the answer includes a plurality of images or several formulas, the processor 120 may synchronize description information of describing the images or the formulas with the images or the formulas. While outputting a specific image or formula, the processor 120 may output a voice signal for the corresponding image and formula. If the output of the voice signal for the corresponding image or formula is ended, the processor 120 may output a next image or formula and may output a voice signal corresponding to the next image or formula.

Figure 4:
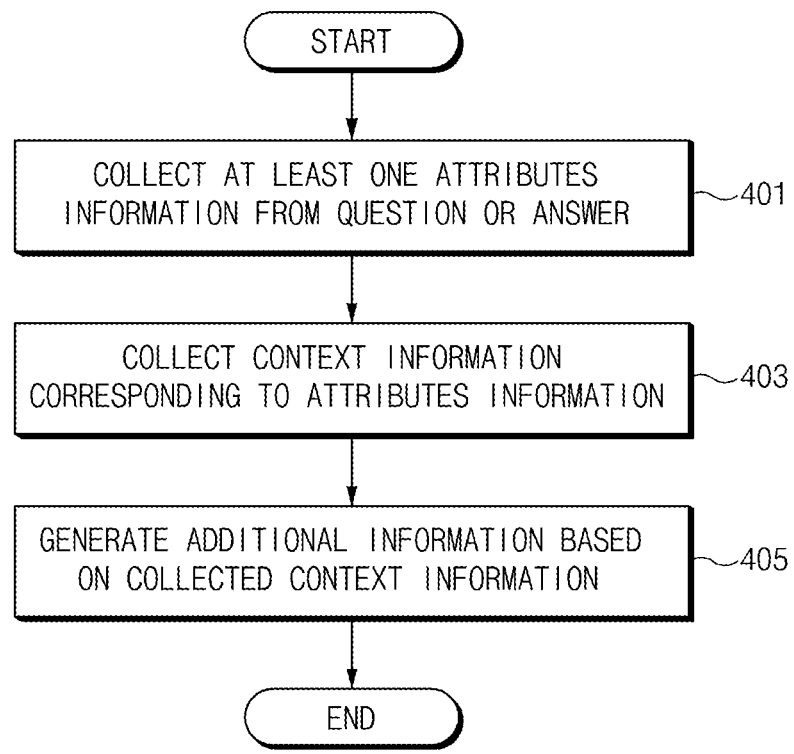
FIG. 4 is a flowchart illustrating an example of a method for generating additional information according to an example embodiment.

FIG. 4 is a flowchart illustrating an example of a method for generating additional information according to an example embodiment.

Referring to FIG. 4, in the method for generating the additional information, in operation 401, a processor 120 (e.g., a question processing module 121) of FIG. 2 may collect at least one attributes information from a question or an answer. For example, the processor 120 may collect attributes information corresponding to a question or an answer using a question database 131 or an answer database 133 of FIG. 1. If attributes of the question are the same as attributes of the answer, the processor 120 may collect only one attributes information.

In operation 403, the processor 120 (e.g., an additional information generation module 123 of FIG. 2) may collect context information corresponding to the attributes information. For example, if attributes information is information indicating geography or a location, the processor 120 may collect information about a current location of a user of an electronic device 100 of FIG. 1 (e.g., a location of a home where he or she lives, a his or her location in the home, or the like). According to various embodiments, if the attributes information is information about a person, the processor 120 may operate a sensor 180 of FIG. 1 (e.g., a camera or an image sensor) to obtain face information of the user. If the attributes information is season or weather information, the processor 120 may operate the sensor 180 (e.g., a temperature sensor and a humidity sensor) to obtain information about temperature, humidity, illumination intensity, and the like.

In operation 405, the processor 120 may generate additional information based on the context information. If the context information is obtained, the processor 120 may generate additional information associated with an answer obtained based on the context information. For example, if the answer is information about a specified place name, the processor 120 may generate distance information from a current location of the user to a specified place as additional information. If the answer is information about a person, the processor 120 may compare a face of the person with a face of the user and may generate additional information (e.g., a description of a similar degree of a face) based on a matching degree. If the answer is weather information, the processor 120 may generate information about a current temperature and humidity as additional information.

In connection with generating the above-mentioned additional information, the electronic device 100 may include a database of defining attributes of the additional information, linked with attributes of a specific answer. The database of defining the attributes of the additional information may include a method of obtaining information corresponding to the attributes of the additional information. For example, the database of defining the attributes of the additional information may include a method designed to use a location sensor when additional information associated with a location is generated, a method designed to use a face recognition and comparison program when additional information associated with a person is generated, a method designed to use a temperature/humidity sensor when additional information associated with weather is generated, and the like. The database of defining the attributes of the additional information may be changed based on a user setting or may be updated by data provided from a specified server.

Figure 5:
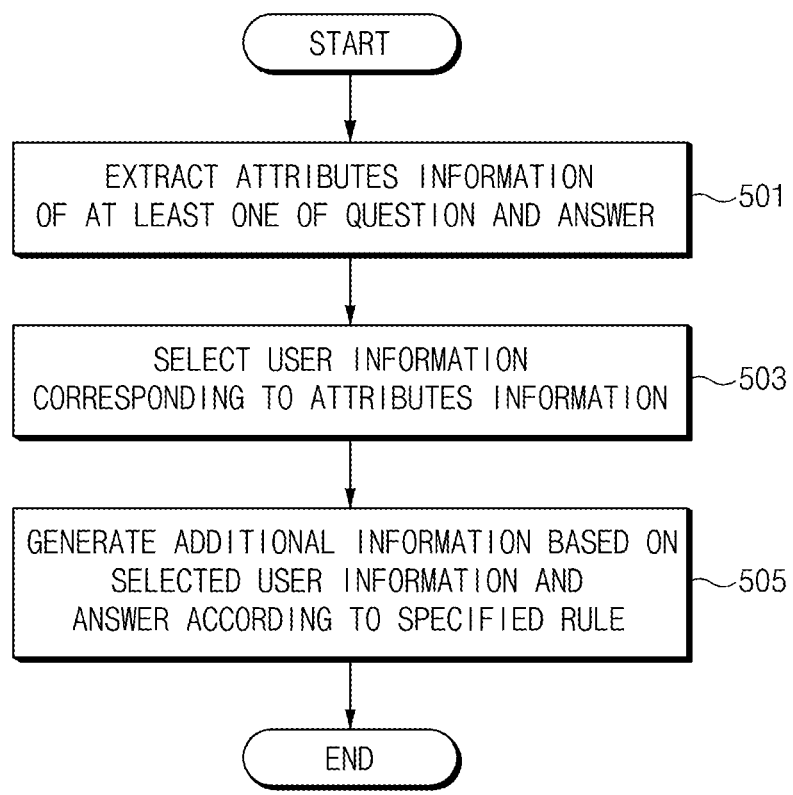
FIG. 5 is a flowchart illustrating another example of a method for generating additional information according to an example embodiment.

FIG. 5 is a flowchart illustrating another example of a method for generating additional information according to an example embodiment.

Referring to FIG. 5, in the method for generating the additional information, in operation 501, a processor 120 (e.g., a question processing module 121) of FIG. 2 may extract attributes information of at least one of an answer and a question. For example, if an answer is drawn based on an answer database 133 of FIG. 1, the processor 120 may extract attributes information corresponding to the drawn answer from the answer database 133.

In operation 503, the processor 120 (e.g., an additional information generation module 123 of FIG. 2) may select user information corresponding to the attributes information. In this regard, the electronic device 100 may store and manage a table in which attributes information stored in the answer database 133 is mapped to each of user information. According to an example embodiment, if the attributes of the answer are health, the processor 120 may obtain age, height, and weight information among user information. Also, if the attributes of the answer are sports, the processor 120 may obtain hobby information, special ability information, or the like among user information. If the attributes of the answer are economy, the processor 120 may obtain real estate information and the like based on home address information of a user of the electronic device 100.

In operation 505, the processor 120 may generate additional information based on the selected user and the answer based on a specified rule. For example, if a healthy weight for each age is an answer, the processor 120 may generate information about a heath state of the user as additional information with respect to his or her age, height, and weight. Also, if today's baseball situation is an answer, the processor 120 may generate information about actual results of other sports (e.g., football) teams selected by a hobby or preference of the user as additional information. Also, if a real estate price of a specific area is an answer, the processor 120 may generate real estate price information of an area the user lives currently as additional information.

Figure 6:
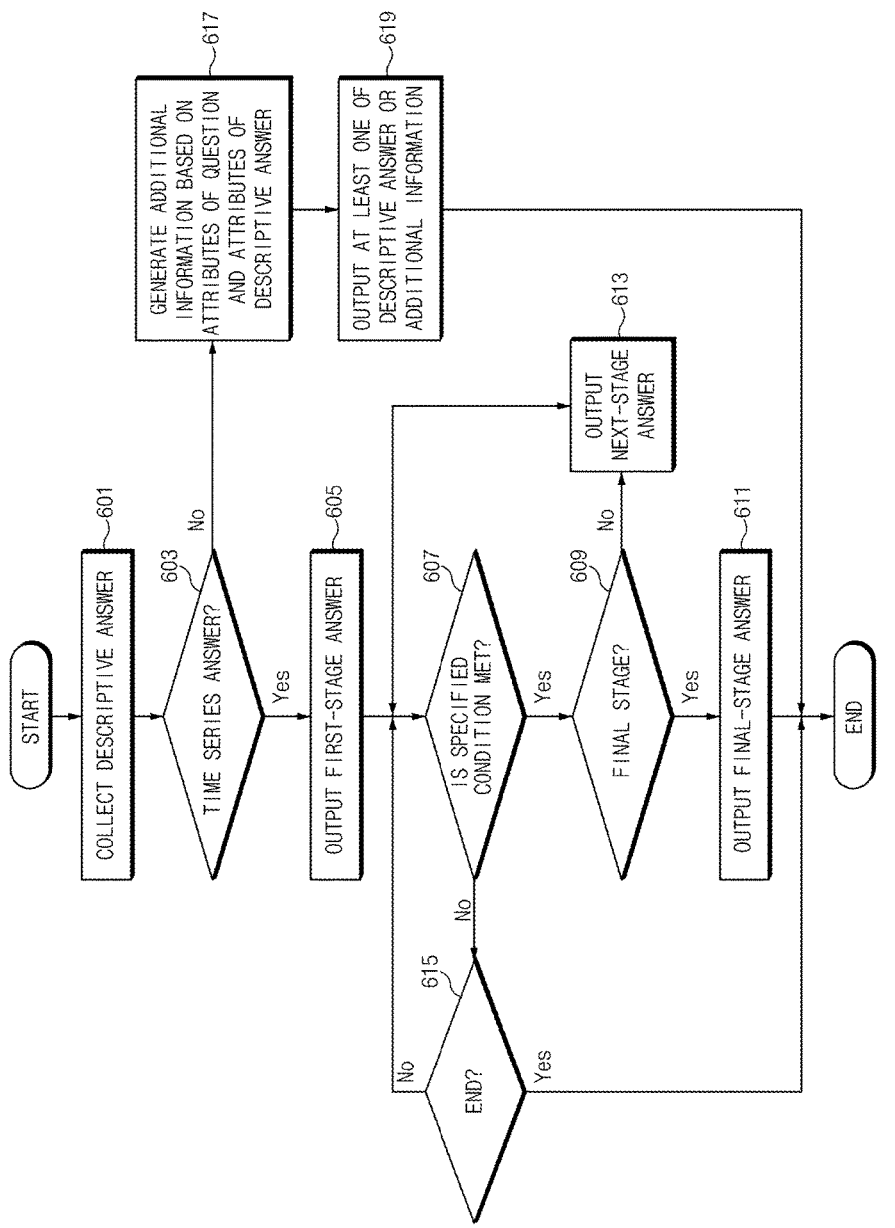
FIG. 6 is a flowchart illustrating an example of a method for outputting a descriptive answer according to an example embodiment.

FIG. 6 is a flowchart illustrating an example of a method for outputting a descriptive answer according to an example embodiment.

Referring to FIG. 6, in connection with the method for outputting the descriptive answer, in operation 601, a processor 120 (e.g., a question processing module 121) of FIG. 2 may collect a descriptive answer. For example, the processor 120 may collect a descriptive answer mapped to a corresponding question based on a question database 131 and an answer database 133 of FIG. 1 corresponding to an analysis of a collected voice signal and the analyzed result. If there is no data associated with a question or an answer in the question database 131 or the answer database 133, the processor 120 may send a user voice signal (or a result of analyzing the voice signal) to a server via a communication interface 170 of FIG. 1 and may collect an answer corresponding to the user voice signal.

In operation 603, the processor 120 (e.g., the question processing module 121) may determine whether the collected descriptive answer is a time series answer. For example, the processor 120 may determine whether specified words (e.g., a stage, an operation, a process, and the like) indicating the time series answer are included in the descriptive answer. Alternatively, the processor 120 may determine whether specified numbers, for example, "1.1", "1-1", "a) and b)", "A) and B)", or the like, indicating the time series answer are included in the descriptive answer. The processor 120 may determine whether a plurality of conjunctions associated with the time series answer are included in the answer.

If the collected descriptive answer is the time series answer, in operation 605, the processor 120 (e.g., an output module of FIG. 2) may output a first-stage answer in a multistage descriptive answer. For example, the processor 120 may determine a range from a start portion of an answer to a period, a range before a specified conjunction, or a range before a specified number as a first stage. The processor 120 may convert text corresponding to the determined first stage into a voice signal and may output the converted voice signal. According to various example embodiments, if the first-stage answer is configured with a voice signal, the processor 120 may output the voice signal corresponding to the answer to a specified device (e.g., at least one external electronic device 200). According to various example embodiments, if an image, a formula, or the like is included in the answer, the processor 120 may provide a screen corresponding to the corresponding image or formula to the specified external electronic device 200 or may send address information (or link information) corresponding to the corresponding image or formula to the specified external electronic device 200.

After outputting the first-stage answer, in operation 607, the processor 120 (e.g., the output module 125) may determine whether a specified condition is met. The specified condition may include, for example, a condition of determining whether specified user gesture information is collected. In this regard, the processor 120 may operate a sensor 180 (e.g., a camera or an image sensor) to collect an image for a face, hand, body, or the like of a user of an electronic device 100 of FIG. 1 and may determine whether the user performs a specific gesture based on analyzing the corresponding image. According to various example embodiments, the specified condition may include a condition of collecting a specified voice signal. In this regard, after the outputting the first-stage answer, the processor 120 may activate an audio device 110 of FIG. 1 to collect a user voice signal and may determine whether a voice signal corresponding to the specified condition is included in the collected voice signals.

According to various example embodiments, the processor 120 may determine whether a user gesture corresponding to a word included in the first-stage answer (e.g., a word associated with an operation). If the user gesture corresponding to the word included in the corresponding stage is collected, the processor 120 may determine whether the specified condition is met. In this regard, the processor 120 may operate an image sensor included the electronic device 100 or may receive sensor information (e.g., acceleration sensor information, geomagnetic sensor information, heartbeat information, or the like) from an electronic device held by the user.

If the specified condition is met, in operation 609, the processor 120 may determine whether a next-stage answer is a final-stage answer. If the next-stage answer is the final-stage answer of the descriptive answer, in operation 611, the processor 120 may output the final-stage answer. For example, the processor 120 may output a voice signal corresponding to the corresponding answer (e.g., convert text into a voice signal and output the converted voice signal). If the next-stage answer is not the final-stage answer, in operation 613, the processor 120 may output the next-stage answer and may branch to operation 607 to perform the operation from operation 607.

If the specified condition is not met in operation 607, in operation 615, the processor 120 may determine whether an event associated with an end occurs. If the event associated with the end does not occur, the processor 120 may branch to operation 607 to perform the operation from operation 607. For example, the processor 120 may determine whether the specified condition is met, in real time or at a period.

If the descriptive answer is not the time series answer in operation 603, in operation 617, the processor 120 (e.g., an addition information generation module 123 of FIG. 2) may generate additional information based on attributes of a question and attributes of a descriptive answer. For example, if a descriptive answer associated with a specific trail is received in response to a question associated with the corresponding trail, the processor 120 may generate a recommended trail as additional information based on an amount of usual exercise of the user. The amount of usual exercise of the user may be obtained from information stored by a healthcare program. In operation 619, the processor 120 may output at least one of the descriptive answer or the additional information.

According to various example embodiments, the time series answer may include a recipe for pasta. In this example, the processor 120 may monitor camera information and sensor information while inputting and outputting information about materials for preparing a recipe and an order of making pasta in a queue (not shown) of the electronic device 100 and may determine a cooking progress situation. The processor 120 may output an answer based on story telling for each cooling stage. In this operation, the processor 120 may compare answered contents with a degree of current progress and may store next-stage story telling (e.g., next story text) in a queue (or buffer) if current-stage cooking is not ended.

According to an example embodiment, in case of a descriptive answer (e.g., recipe information and the like), the processor 120 may wait without completing an answer in the middle. In this example, if a user voice signal for another question is collected, the processor 120 may search for an answer in response to the user voice signal and may output the found answer. In this regard, the processor 120 may actively change a queue order of a descriptive answer and an additional answer. For example, in a situation where the processor 120 waits for an answer No. 3 after an answer No. 2 is completed while cooking having a plurality of stages progresses, if receiving a middle question, the processor 120 may obtain and output an answer to the middle question and may wait for the answer No. 3 again. For example, if receiving a weather question during a cooking stage, the processor 120 may delay a queue of the answer No. 3 and may output a current temperature and weather information. If an answer to the middle question is completed, the processor 120 may restore the queue of the answer No. 3 to an original location. After completing the answer No. 2, the processor 120 may resume monitoring a progress state (e.g., collect and analyze user related context information).

Figure 7:
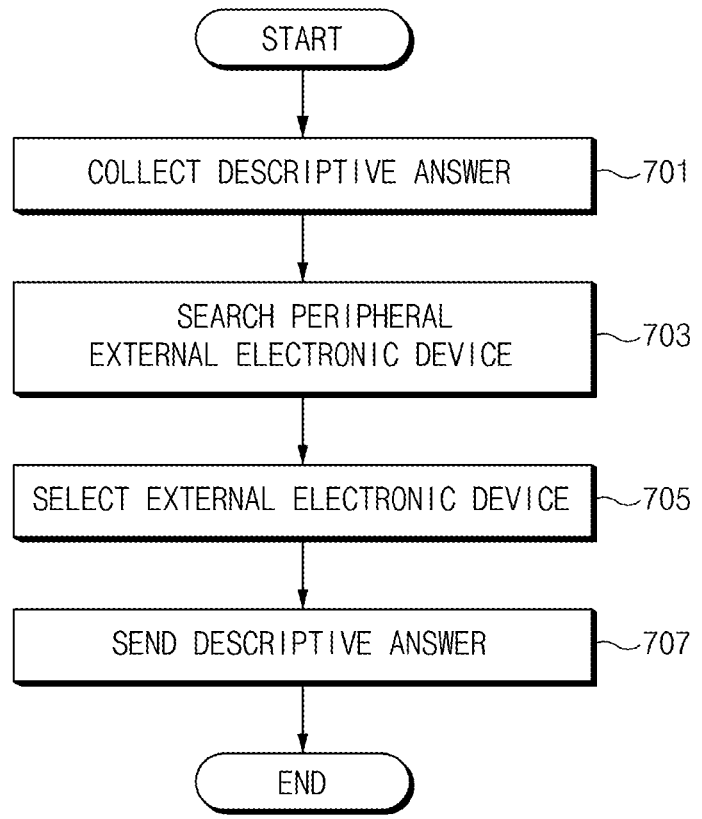
FIG. 7 is a flowchart illustrating another example of a method for outputting a descriptive answer according to an example embodiment.

FIG. 7 is a flowchart illustrating another example of a method for outputting a descriptive answer according to an example embodiment.

Referring to FIG. 7, in connection with the method for outputting the descriptive answer, in operation 701, a processor 120 (e.g., a question processing module 121) of FIG. 2 may collect a descriptive answer. For example, the processor 120 may collect a descriptive answer corresponding to a collected voice signal based on a question database 131 and an answer database 133 of FIG. 1.

In operation 703, the processor 120 (e.g., an output module 125 of FIG. 2) may search a peripheral external electronic device. The processor 120 may search at least one external electronic device located within a distance using a short-distance communication module included in a communication interface 170 of FIG. 1.

In operation 705, the processor 120 may select the external electronic device. For example, the processor 120 may select the number of peripheral external electronic devices or a type of an external electronic device in a different way based on attributes of the collected descriptive answer. For example, the processor 120 may select the number of external electronic devices or a type of an external electronic device based on the entire length of the descriptive answer. According to an example embodiment, if the entire length of the descriptive answer is greater than or equal to a specified length, the processor 120 may select a relatively greater number of external electronic devices. If the entire length of the descriptive answer is less than the specified length, the processor 120 may select a relatively fewer number of external electronic devices. Also, if the descriptive answer is an answer with a cadence (e.g., a sijo, a song, and the like), the processor 120 may select an external electronic device with external excellent speaker quality.

In operation 707, the processor 120 may send the descriptive answer to the external electronic device 200. In this regard, the processor 120 may establish a communication channel with the external electronic device 200 using a short-distance communication module (or a communication module supporting an Internet network and the like) and may send the descriptive answer to the external electronic device 200 based on the communication channel. According to various example embodiments, a QA processing system may further include an Internet of things (IoT) hub (or at least one processor). The electronic device 100 and the at least one external electronic device 200 may establish a communication channel with the IoT hub. In such environment, the electronic device 100 may send the descriptive answer to the IoT hub. The IoT hub may send the descriptive answer to the at least one specified external device 200. According to an example embodiment, the IoT hub may determine attributes of the descriptive answer provided from the electronic device 100 and may send the descriptive answer to the at least one specified external electronic device 200 based on the determined attributes. In this regard, the IoT may store information about attributes of descriptive answers and mapping information associated with external electronic device selected by the corresponding attributes in its database. According to various example embodiments, the IoT hub may send the received descriptive answer to the external electronic device 200 selected by the electronic device 100 based on a descriptive answer provided from the electronic device 100 and a list of the at least one external electronic device 200. The electronic device 100 and the at least one external electronic device 200 may connect with the IoT hub wiredly or wirelessly.

Figure 8:
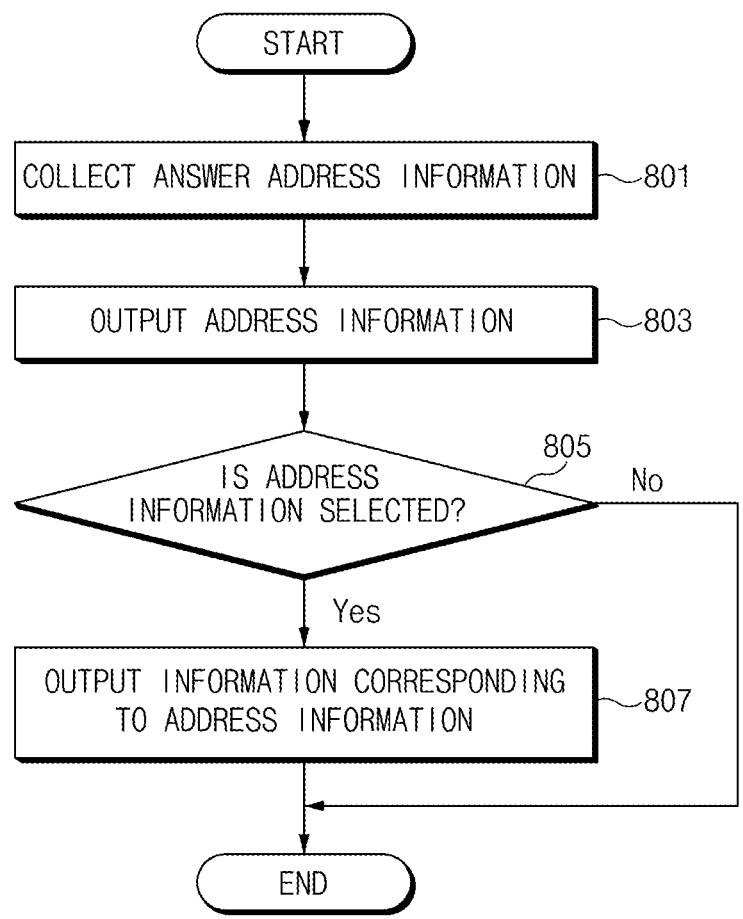
FIG. 8 is a flowchart illustrating another example of a method for outputting a descriptive answer according to an example embodiment.

FIG. 8 is a flowchart illustrating another example of a method for outputting a descriptive answer according to an example embodiment.

Referring to FIG. 8, in connection with the method for outputting the descriptive answer in case of no short answer or descriptive answer, in operation 801, a processor 120 (e.g., a question processing module 121) of FIG. 2 may collect answer address information. According to an example embodiment, if at least part of an answer to a question includes an image, a formula, or the like, the processor 120 may obtain address information of a location (e.g., uniform resource locator (URL) information, sound quick response (QR) information, or the like) which stores the answer. The address information may include address information of an answer database 133 of an electronic device 100 of FIG. 1, which may store the answer, address information of an external electronic device 200 of FIG. 1, address information of a specified server, or the like.

In operation 803, the processor 120 may output the address information. For example, the processor 120 may output the address information to a specified device (e.g., the external electronic device 200 or the like). In the output process, the processor 120 may output the address information as link information. According to an embodiment, the processor 120 may display linked information corresponding to the address information. When the address information is selected, the processor 120 may display screen related to the linked information.

In operation 805, the processor 120 may obtain information of whether an input signal associated with selecting the address information is generated. If the input signal associated with selecting the address information is generated, in operation 807, the processor 120 may control an output of information corresponding to the address information. According to various example embodiments, the processor 120 may output the address information on the display 160. If a touch input for selecting the corresponding address information occurs on the display 160, the processor 120 may output answer information corresponding to the address information on the display 160. According to various example embodiments, the processor 120 may send the address information to the specified external device 200. The external electronic device 200 may output the received address information on its display and may collect and output answer information corresponding to the address information based on a user input. In this regard, the external electronic device 200 may establish a communication channel with the electronic device 100, another external electronic device, a server, or the like based on the address information and may receive answer information from the corresponding device. According to various example embodiments, the processor 120 may receive a user input signal from an external electronic device which outputs address information and may send answer information to the external electronic device in response to the user input signal.

If the address information is not selected, the processor 120 may omit operation 807. The processor 120 may maintain the output of the address information during a specified time. If the specified time elapses, the processor 120 may stop outputting the address information. According to various example embodiments, the processor 120 may store and manage the address information which is not selected. The processor 120 may output a list of address information on the display 160 based on a user input. If the user input (e.g., an input associated with selecting address information) occurs, the processor 120 may perform operation 807 above.

Figure 9:
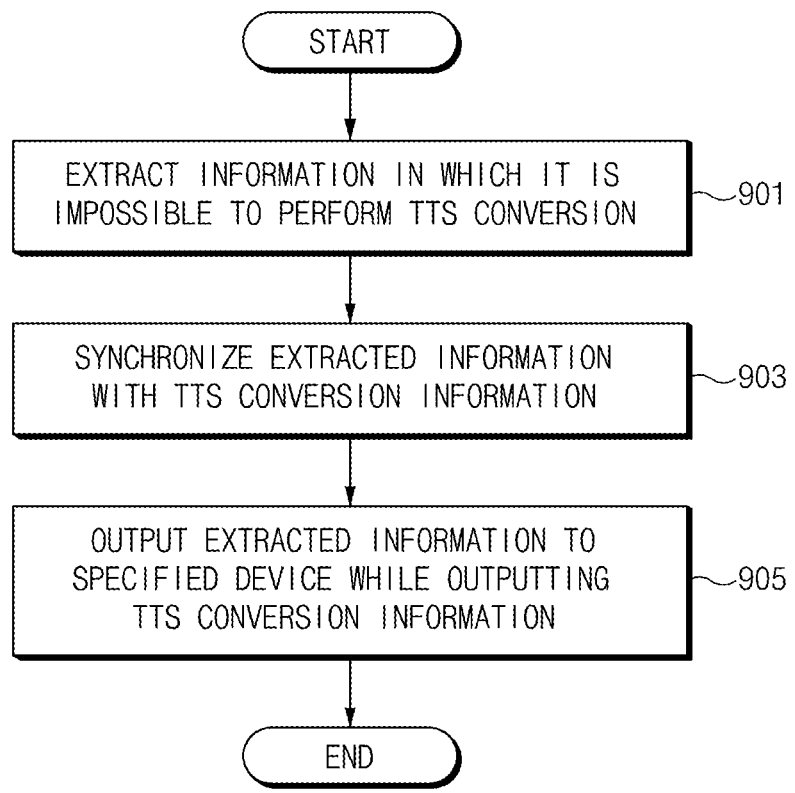
FIG. 9 is a flowchart illustrating an example of an information output method according to an example embodiment.

FIG. 9 is a flowchart illustrating an example of an information output method according to an example embodiment.

Referring to FIG. 9, in the information output method, in operation 901, a processor 120 (e.g., an output module 125) of FIG. 2 may extract information in which it is impossible to perform text to speech (TTS) conversion. For example, if obtaining an answer to a question based on an answer database 133, the processor 120 may analyze the obtained answer and may determine whether specified information (e.g., an image, a formula, a special letter, and the like) in which it is impossible to perform TTS conversion is included in the answer. If the specified information is included in the answer, the processor 120 may extract the corresponding information from the answer. Also, the processor 120 may collect a location in content of the specified information. The processor 120 may collect text located in a front end of the specified information, text located in a rear end of the specified information, and the like.

In operation 903, the processor 120 may synchronize the extracted information with TTS conversion information. For example, the processor 120 may convert information in which it is possible to perform TTS conversion, except for the specified information, into a voice signal. Also, the processor 120 may perform a synchronization process of adjusting a time when the converted voice signal is input based on location information of the specified information.

In operation 905, the processor 120 may output the extracted information to a specified device while outputting the TTS conversion information. For example, the processor 120 may output specified information associated with the voice signal on a screen of the specified device while outputting part of the converted voice signal. If the output of the voice signal associated with the specified information is completed, the processor 120 the processor 120 may output a voice signal associated with subsequent specified information while outputting the subsequent specified information.

According to various example embodiments, if an external electronic device which outputs an answer in which it is difficult to perform TTS conversion is not found, the processor 120 may send the corresponding answer using an electronic mail (email) of a specified account. As described above, the electronic device 100 according to various example embodiments may represent a formula, a mathematical proof, a descriptive answer, or the like in which it is difficult to be represented by conversation, using a push service such as a URL or a sound QR via a device, such as a mobile phone and a tablet personal computer (PC), in which it is easy to be represented by conversion. The electronic device 100 may provide information in which it is difficult to be represented by TTS in the form of a URL or in the form of being able to be output. Also, the electronic device 100 may provide the information, in which it is difficult to be represented by the TTS, as a file (e.g., a DOC file, a JPG file, a PDF file, or the like) of a form which may be output to support to verify and output an answer in an offline environment where the Internet does not connect with the electronic device 100.

Figure 10A:
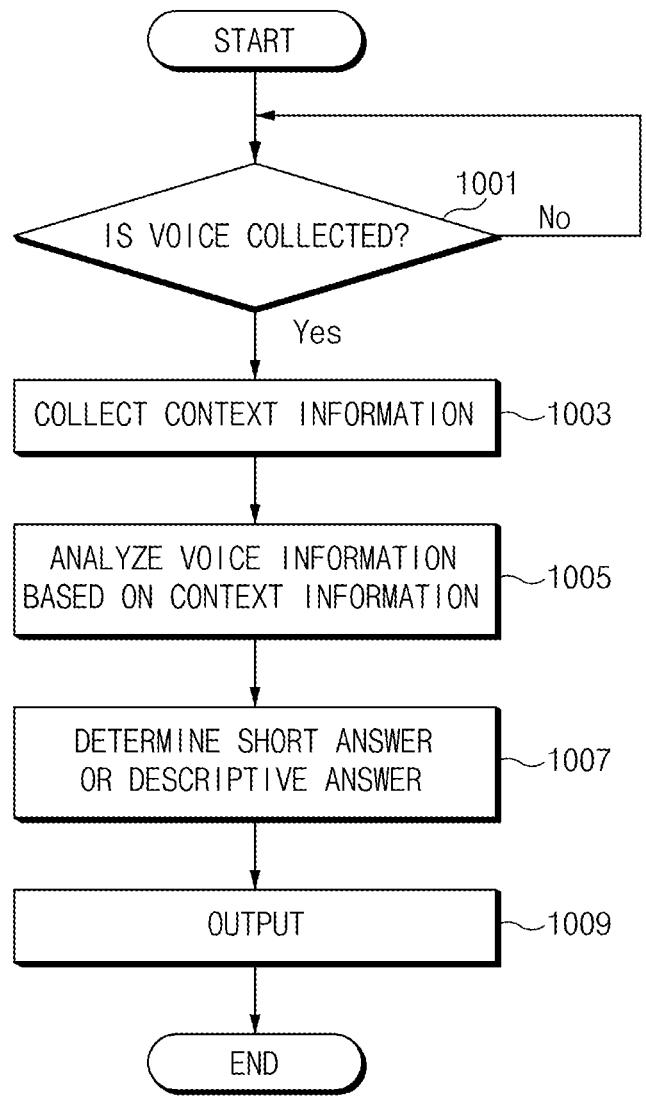
FIG. 10A is a flowchart illustrating another example of a QA processing method according to an example embodiment.

FIG. 10A is a flowchart illustrating another example of a QA processing method according to an example embodiment.

Referring to FIG. 10A, in the QA processing method, in operation 1001, a processor 120 (e.g., a question processing module 121) of FIG. 2 may determine whether a voice is collected. If the voice is not collected, the processor 120 may maintain a previous operation. While maintaining a sleep state, the processor 120 may maintain only an audio device 110 of FIG. 2 in an idle state.

If the voice is collected, in operation 1003, the processor 120 may collect context information. If a user voice signal is received, the processor 120 may obtain a user related image or may collect user related information, using a sensor 180 of FIG. 1 (e.g., an image sensor, a location information sensor, or the like).

In operation 1005, the processor 120 may analyze voice information based on context information. In this regard, the processor 120 may convert the received user voice signal into text. The processor 120 may configure a question based on the converted text.

In operation 1007, the processor 120 may select one of a short answer or a descriptive answer based on the result of analyzing the information. For example, the processor 120 may search a question database 131 and an answer database 133 of FIG. 1 or a server for an answer to a question and may select at least one of a short answer or a descriptive answer in response to the context information. For example, if a question on a location of a bus of a specific number is collected and if a user of an electronic device 100 of FIG. 1 is located in his or her living room, the processor 120 may communicate with a bus management server to obtain a short answer to a time when the bus of the corresponding number arrives at a bus stop. If the user is currently located in his or her dressing room, the processor 120 may communicate with the bus management server to obtain a plurality of answers to times when buses of the corresponding number will arrive at a specified bus stop. Also, the processor 120 may obtain an answer to a state where seats of each bus are occupied. In operation 1009, the processor 120 may output a corresponding answer in a specified manner based on a type of a selected answer.

Figure 10B:
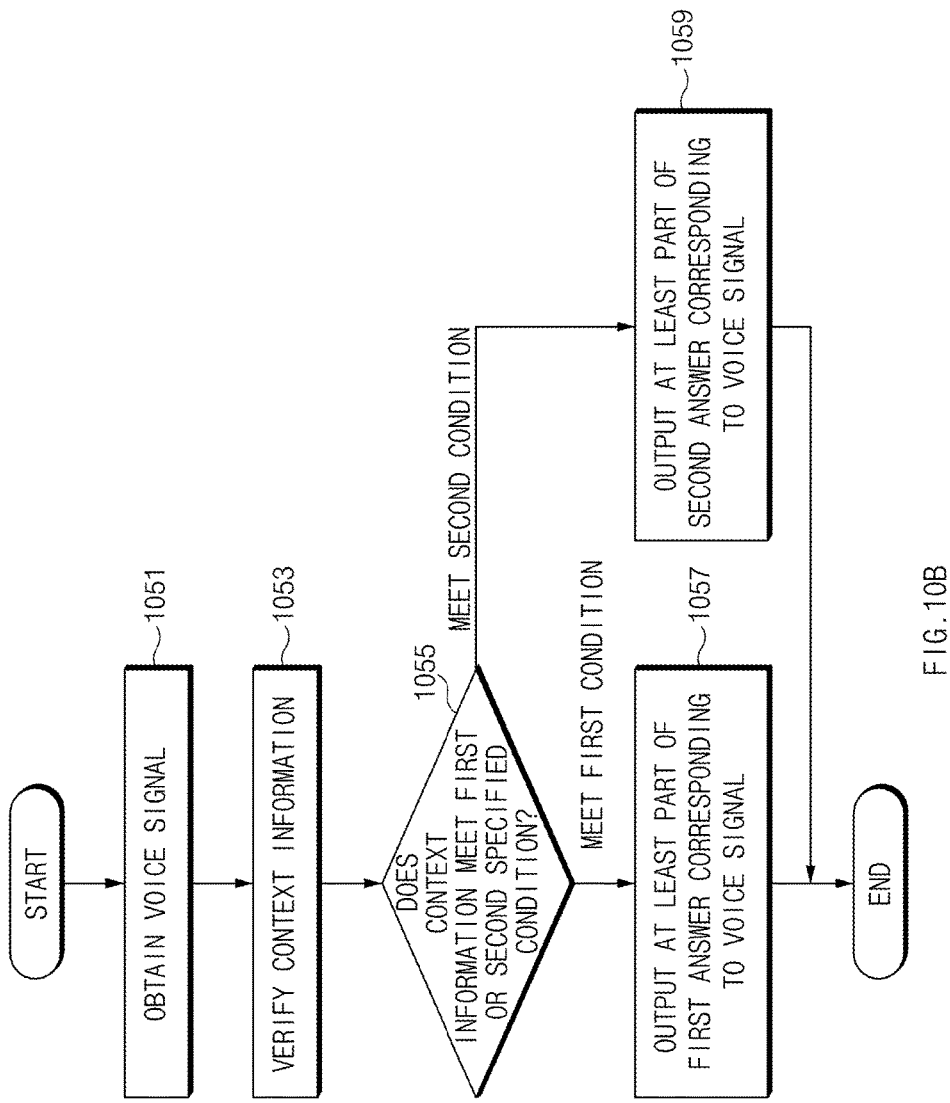
FIG. 10B is a flowchart illustrating another example of a QA processing method according to an example embodiment.

FIG. 10B is a flowchart illustrating another example of a QA processing method according to an example embodiment.

Referring to FIG. 10B, in operation 1051, a processor 120 (e.g., a question processing module 121) of FIG. 2 may obtain a voice signal corresponding to a user of an electronic device 100 of FIG. 1. For example, the processor 120 may collect a voice signal (or a user command) of the user using a microphone of the electronic device 100 or may receive a voice signal or text via a communication interface 170 of the electronic device 100 from an external device (e.g., the external electronic device 200).

In operation 1053, the processor 120 (e.g., the question processing module 121) may obtain context information associated with the user, in connection with obtaining the voice signal. For example, the processor 120 may analyze the obtained user voice signal or text and may extract a question from the voice signal. The processor 120 may analyze attributes information of a question and may obtain user information associated with the attributes information from the memory 130. The processor 120 may obtain context information (e.g., image information) associated with the attributes information of the question.

In operation 1055, the processor 120 (e.g., the question processing module 121) may determine whether the context information meets a first specified condition or a second specified condition. For example, the first specified condition may include a condition in which a response length of a question is within a length. The first specified condition may include a condition in which a user who asks is a first specified user. The first specified condition may include a condition in which an asked location is a first specified location. The first specified condition may include a first condition in which a special letter or an image is not included in a question or an answer to the question. The first specified condition may include a condition in which the user who asks takes a gesture or pose of the first specified condition. The second specified condition may include a condition in which a response length of a question is greater than or equal to a length. The second specified condition in which the user who asks is a second specified condition. The second specified condition may include a condition in which the asked location is a second specified location. The second specified condition may include a second condition in which a special letter or an image is included in a question or an answer to the question. The second specified condition may include a condition in which the user who asks takes a gesture or pose of the second specified condition.

If the context information meets the first specified condition, in operation 1057, the processor 120 (e.g., an output module 125 of FIG. 1) may output at least part of information corresponding to the command signal. According to various embodiments, the processor 120 (e.g., an additional information generation module 123) of FIG. 2 may obtain an answer based on the first specified condition and may generate additional information based on the first condition, associated with a question or an answer associated with the first specified condition. The processor 120 may output at least part of an answer to a question or the additional information according to the first condition.

If the context information meets the second specified condition, in operation 1059, the processor 120 (e.g., the output module 125) may output at least part of second answer information corresponding to the voice signal. According to various embodiments, the processor 120 (e.g., the additional information generation module 123) may obtain an answer based on the second specified condition and may generate additional information according to the second condition, associated with a question or answer associated with the second specified condition. The processor 120 may output at least part of an answer to a question or the additional information according to the second condition. The processor 120 (e.g., the output module 125) may output at least one of types of external electronic devices or the number of the external electronic devices, output based on the first specified condition and the second specified condition, in a different way.

Operations (e.g., operations 301 to 313, operations 401 to 405, operations 501 to 505, operations 601 to 619, operations 701 to 707, operations 801 to 807, operations 901 to 905, or operations 1001 to 1009) described in processes or methods shown in FIGS. 3 to 10B may be executed by a successive method, a parallel method, a repeated method, or a heuristic method. For example, the operations may be executed in a different order, some operations may be omitted from the operations, or other operations may be added to the operations.

According to various example embodiments, a QA processing method may include: obtaining a voice signal corresponding to a user, obtaining context information associated with the user in connection with obtaining the voice signal, determining whether the context information meets a first specified condition or a second specified condition, and outputting at least part of first answer information corresponding to the voice signal if the context information meets the first specified condition and outputting at least part of second response information corresponding to the voice signal if the context information meets the second specified condition.

According to various example embodiments, the obtaining of the voice signal may include receiving the voice signal from the user using a microphone of the electronic device.

According to various example embodiments, at least part of the obtaining of the voice signal may include receiving the voice signal using a communication interface of the electronic device from an external electronic device.

According to various example embodiments, the QA processing method may further include obtaining an image corresponding to the user. The obtaining of the context information may include obtaining the context information further based on the image.

According to various example embodiments, the QA processing method may further include obtaining attributes information about the answer and providing the answer information using a method different from a specified method for providing the answer information if the attributes information meets a specified condition.

According to various example embodiments, the specified method may include providing the answer information through a sound. The providing of the answer information may include providing the answer information as an image or text if the attributes information meets the specified condition.

According to various example embodiments, the attributes information may include a text length of the answer information, information indicating whether a special letter is included, a category, or combinations thereof. The QA processing method may further include generating information corresponding to the specified condition based on at least part of the attributes information.

According to various example embodiments, the outputting may include outputting information which is not converted into a voice signal among additional information on a screen of a specified device or outputting address information corresponding to a storage location in which the additional information is stored on the screen of the specified device.

According to various example embodiments, the above-mentioned QA processing method may include sharing a database with a memory (or a storage device) of a peripheral electronic device in connection with generating additional information and generating additional information based on the shared database, identifying a speaker through voice and face recognition of a user who asks and discriminately providing an answer for each identified speaker, and storing and managing answer history and generating additional information based on the stored and managed answer history.

According to various example embodiments, the above-mentioned QA processing method may be configured to generate additional information in connection with an answer output for each stage in connection with generating the additional information and to generate the additional information to change a form of provided additional information, based on user information of a monitored user (e.g., a body condition, an age, a location in family members, a hobby, a preference, and the like). For example, the QA processing method may include changing a detail drawing of a description for each stage based on user information if additional information associated with a song lecture, block assembly, or the like is generated. The QA processing method may include applying a setting condition of entering a subsequent stage in a time series answer of entering the subsequent stage after specified context information should be obtained to user information in a different way (e.g., providing an easier setting condition to a relatively younger or more unskilled user and providing a more difficult setting condition to a relatively older or more skilled user).

According to various example embodiments, the QA processing method may include changing types of external electronic devices and the number of the external electronic devices to transmit an answer or additional information for each user who asks.

According to various example embodiments, the present disclosure may provide a question and answer (QA) processing method, the method may include: obtaining a voice signal of a user in the electronic device, converting the obtained voice signal into text, searching for a question corresponding to the converted text or an answer corresponding to the question based on data stored in a memory operatively connected with the electronic device, obtaining attributes information of the found question or answer, generating additional information based on the answer and the attributes information and outputting at least one of the answer or the additional information.

According to various example embodiments, the outputting may include at least one of obtaining an image using an image sensor operatively connected with the electronic device and outputting at least one of the answer or the additional information, if a result of analyzing the obtained image meets a condition.

According to various example embodiments, the outputting may include outputting information which is not converted into a voice signal in the additional information on a screen of a device and outputting address information corresponding to a storage location at which the additional information is stored, on the screen of the device.

According to various example embodiments, the outputting may include obtaining an image using an image sensor operatively connected with the electronic device and converting the additional information into a voice signal and outputting the converted voice signal, if a result of analyzing the obtained image meets a condition.

According to various example embodiments, the outputting may include at least one of outputting at least part of the answer and waiting for outputting next part of the answer before a condition is met and outputting next part of the output answer, if the condition is met.

According to various example embodiments, the method may further include outputting an answer to another question, if the other answer is received before the condition is met.

Figure 11:
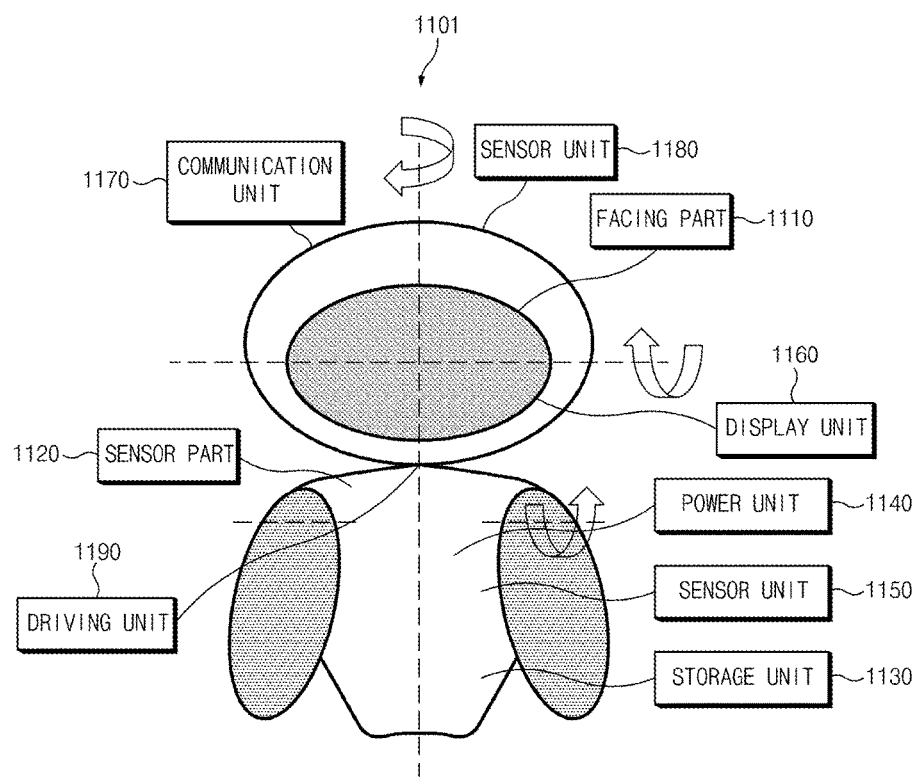
FIG. 11 is a diagram illustrating an example form of an electronic device according to an example embodiment.

FIG. 11 is a diagram illustrating an example form of an electronic device according to an example embodiment.

Referring to FIG. 11, an electronic device 1101 may be an electronic device of a robot form. The electronic device 1101 may include, for example, a facing part 1110, sensor units 1120, 1150, and 1180, a storage unit 1130, a power unit 1140, a display unit 1160, a communication unit (e.g., including communication circuitry) 1170, and a driving unit (e.g., including driving circuitry) 1190.

Further, the electronic device 1101 may be classified into a standalone type and a docking station type of mounting a smartphone or a tablet PC. Further, the electronic device 1101 may be classified into a fixed type and a mobile type based on whether it has mobility. The mobile type may be divided into a wheel type of having at least one wheel and moving based on rotation of the wheel, a caterpillar type of including at least one track and moving in a direction based on rotation of the track, a leg moving type (e.g., a two-foot type or a four-foot type) of including at least one leg and performing rotation, running, a jump, or the like in a direction through leg moving, and a flying type of including at least one propeller and floating based on lift.

The electronic device 1101 may have at least one driving unit 1190. The driving unit 1190 may include various circuitry and mechanical hardware that may be used to move the electronic device 1101 and mechanically change another component of the electronic device 1101. A form of the driving unit 1190 may be an upper/lower or left/right movable form on at least one spindle and may be implemented in various ways.

A controller (not shown) (e.g., a processor 120 of FIG. 1) may include at least one or more of an application processor (AP), a communication processor (CP), a graphic processor (GP), a multi-chip package (MCP), an image processor (IP), and the like, each of which performs processing for driving the electronic device 1101 and providing a service. The facing part 1110 may be a part indicating a direction where interaction with a user of the electronic device 1101 is performed and may include the sensor units 1120, 1150, and 1180 including at least one sensor for performing image sensing, at least one microphone for obtaining a voice, a mechanical eye structure, and a display unit 1160 for outputting a screen. The facing part 1110 may display information through light or a temporal mechanical change in a form where a direction is distinguished. When interaction with the user is performed, the facing part 1110 may include at least one hardware (H/W) or mechanical structure which heads for the user.

Figure 12:
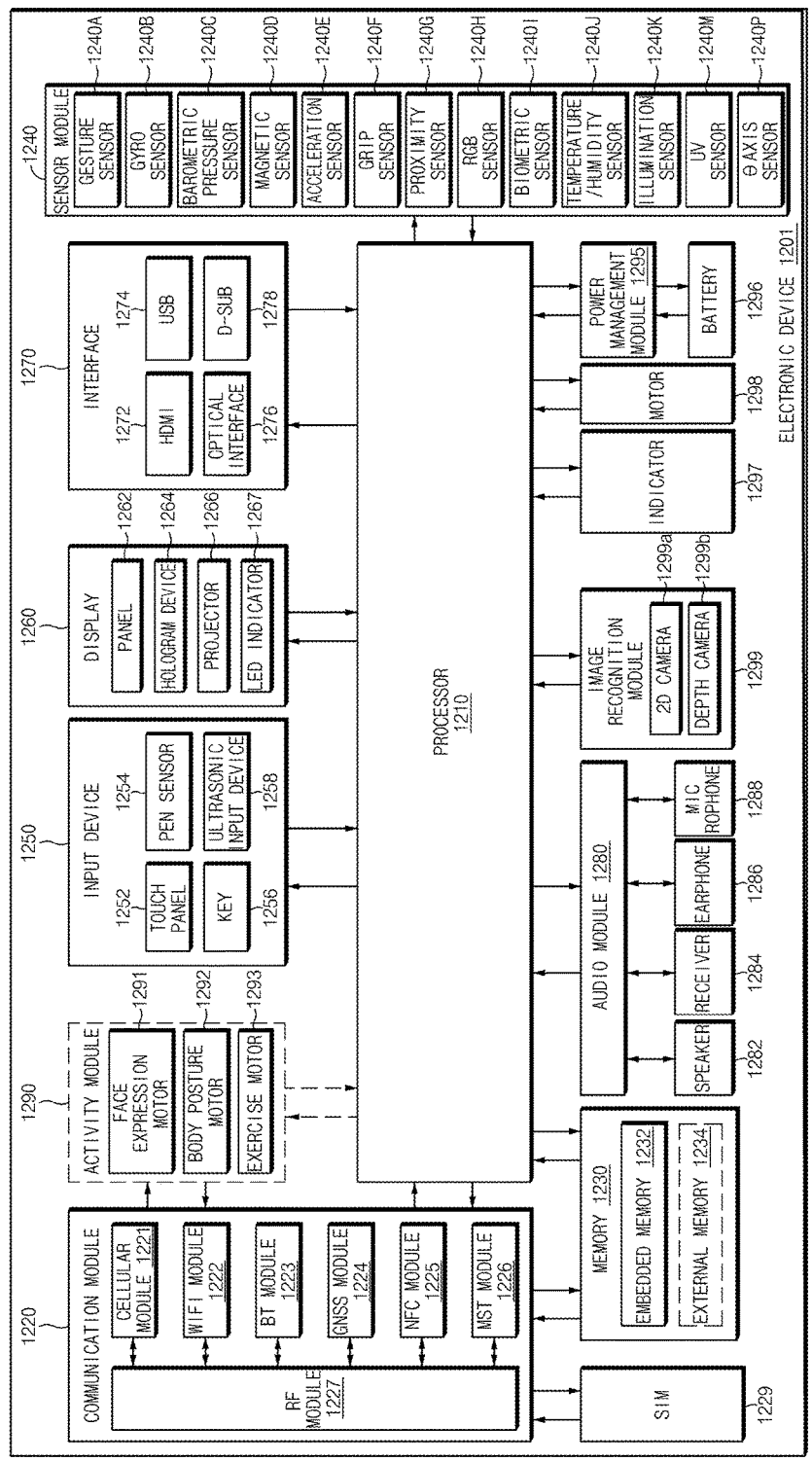
FIG. 12 is a block diagram illustrating example hardware components of an electronic device according to an example embodiment.

FIG. 12 is a block diagram illustrating example hardware components of an electronic device according to an example embodiment.

An electronic device 1201 may include all or some of components of an electronic device described with reference to FIGS. 1 to 11. The electronic device 1201 may include one or more processors 1210 (e.g., application processors (APs)), a communication module (e.g., including communication circuitry) 1220, a subscriber identity module (SIM) 1229, a memory 1230, a sensor module 1240, an input device (e.g., including input circuitry) 1250, a display 1260, an interface (e.g., including interface circuitry) 1270, an audio module 1280, an activity module 1290, an image recognition module 1299, a power management module 1295, a battery 1296, an indicator 1297, and a motor 1298.

The processor 1210 may drive, for example, an operating system (OS) or an application program to control a plurality of hardware or software components connected thereto and may process and compute a variety of data. The processor 1210 may be implemented with, for example, a system on chip (SoC). According to an embodiment, the processor 1210 may include a graphic processing unit (GPU) (not shown) and/or an image signal processor (not shown). The processor 1210 may include at least some (e.g., a cellular module 1221) of the components shown in FIG. 12. The processor 1210 may load a command or data received from at least one of other components (e.g., a non-volatile memory) into a volatile memory to process the data and may store various data in a non-volatile memory.

The communication module 1220 may have the same or similar configuration to a communication interface 1370 of FIG. 1. The communication module 1220 may include various communication circuitry, such as, for example, and without limitation, the cellular module 1221, a wireless-fidelity (Wi-Fi) module 1222, a Bluetooth (BT) module 1223, a global navigation satellite system (GNSS) module 1224 (e.g., a GPS module, a Glonass module, a Beidou module, or a Galileo module), a near field communication (NFC) module 1225, an MST module 1226, and a radio frequency (RF) module 1227.

The cellular module 1221 may provide, for example, a voice call service, a video call service, a text message service, or an Internet service, and the like through a communication network. According to an example embodiment, the cellular module 1221 may identify and authenticate the electronic device 1201 in a communication network using the SIM 1229 (e.g., a SIM card). According to an example embodiment, the cellular module 1221 may perform at least part of functions which may be provided by the processor 1210. According to an example embodiment, the cellular module 1221 may include a communication processor (CP).

The Wi-Fi module 1222, the BT module 1223, the GNSS module 1224, the NFC module 1225, or the MST module 1226 may include, for example, a processor for processing data transmitted and received through the corresponding module. According to various example embodiments, at least some (e.g., two or more) of the cellular module 1221, the Wi-Fi module 1222, the BT module 1223, the GNSS module 1224, the NFC module 1225, or the MST module 1226 may be included in one integrated chip (IC) or one IC package.

The RF module 1227 may transmit and receive, for example, a communication signal (e.g., an RF signal). Though not shown, the RF module 1227 may include, for example, a transceiver, a power amplifier module (PAM), a frequency filter, or a low noise amplifier (LNA), or an antenna, and the like. According to another embodiment, at least one of the cellular module 1221, the Wi-Fi module 1222, the BT module 1223, the GNSS module 1224, the NFC module 1225, or the MST module 1226 may transmit and receive an RF signal through a separate RF module.

The SIM 1229 may include, for example, a card which includes a SIM and/or an embedded SIM. The SIM 1229 may include unique identification information (e.g., an integrated circuit card identifier (ICCID)) or subscriber information (e.g., an international mobile subscriber identity (IMSI)).

The memory 1230 (e.g., a memory 130 of FIG. 1) may include, for example, an embedded memory 1232 or an external memory 1234. The embedded memory 1232 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1234 may include a flash drive, for example, a compact flash (CF), a secure digital (SD), a micro-SD, a mini-SD, an extreme digital (xD), a multimedia car (MMC), or a memory stick, and the like. The external memory 1234 may operatively and/or physically connect with the electronic device 1201 through various interfaces.

The sensor module 1240 may measure, for example, a physical quantity or may detect an operation state of the electronic device 1201, and may convert the measured or detected information to an electrical signal. The sensor module 1240 may include at least one of, for example, a gesture sensor 1240A, a gyro sensor 1240B, a barometer (e.g., barometric pressure) sensor 1240C, a magnetic sensor 1240D, an acceleration sensor 1240E, a grip sensor 1240F, a proximity sensor 1240G, a color sensor 1240H (e.g., red, green, blue (RGB) sensor), a biometric sensor 1240I, a temperature/humidity sensor 1240J, an illumination sensor 1240K, an ultraviolet (UV) sensor 1240M or θ axis sensor 1240P. Additionally or alternatively, the sensor module 1240 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1240 may further include a control circuit for controlling at least one or more sensors included therein. According to various embodiments, the electronic device 1201 may further include a processor configured to control the sensor module 1240, as part of the processor 1210 or to be independent of the processor 1210. While the processor 1210 is in a sleep state, the electronic device 1201 may control the sensor module 1240.

The input device 1250 (e.g., interface) may include various input circuitry, such as, for example, and without limitation, a touch panel 1252, a (digital) pen sensor 1254, a key 1256, or an ultrasonic input device 1258. The touch panel 1252 may use at least one of, for example, a capacitive type, a resistive type, an infrared type, or an ultrasonic type. Also, the touch panel 1252 may further include a control circuit. The touch panel 1252 may further include a tactile layer and may provide a tactile reaction to a user.

The (digital) pen sensor 1254 may be, for example, part of the touch panel 1252 or may include a separate sheet for recognition. The key 1256 may include, for example, a physical button, an optical key, or a keypad. The ultrasonic input device 1258 may allow the electronic device 1201 to detect a sound wave using a microphone (e.g., a microphone 1288) and to obtain data through an input tool generating an ultrasonic signal.

The display 1260 (e.g., a display 160 of FIG. 1) may include a panel 1262, a hologram device 1264, a projector 1266, or LED indicator 1267. The panel 1262 may include the same or similar configuration to the display 160. The panel 1262 may be implemented to be, for example, flexible, transparent, or wearable. The panel 1262 and the touch panel 1252 may be integrated into one module. The hologram device 1264 may show a stereoscopic image in a space using interference of light. The projector 1266 may project light onto a screen to display an image. The screen may be positioned, for example, inside or outside the electronic device 1201. According to an embodiment, the display 1260 may further include a control circuit for controlling the panel 1262, the hologram device 1264, or the projector 1266.

The interface 1270 may include various interface circuitry, such as, for example, and without limitation, a high-definition multimedia interface (HDMI) 1272, a universal serial bus (USB) 1274, an optical interface 1276, or a D-subminiature 1278. The interface 1270 may be included in, for example, a communication interface 170 shown in FIG. 1. Additionally or alternatively, the interface 1270 may include, for example, a mobile high definition link (MHL) interface, an SD card/multimedia card (MMC) interface, or an infrared data association (IrDA) standard interface.

The audio module 1280 may convert a sound and an electric signal in dual directions. At least part of components of the audio module 1280 may be included in, for example, an input and output interface 150 (or a user interface) shown in FIG. 1. The audio module 1280 may process sound information input or output through, for example, a speaker 1282, a receiver 1284, an earphone 1286, or the microphone 1288, and the like.

The activity module may 1290 include a face expression motor 1291, body posture motor 1292, and an exercise motor 1293. The face expression motor 1291 may rotate a facing part of a robot. The body posture motor 1292 may rotate an arm of a robot or may provide a posture of a robot. The exercise motor 1293 may provide a movement of a robot in a certain direction.

The image recognition module 1299 may be a device which captures a still image and a moving image. According to an example embodiment, the image recognition module 1299 may include one or more image sensors (not shown) (e.g., a front sensor or a rear sensor), a lens (not shown), an image signal processor (ISP) (not shown), or a flash (not shown) (e.g., an LED or a xenon lamp). The image recognition module 1299 may include a 2D camera 1299a and a depth camera 1299b.

The power management module 1295 may manage, for example, power of the electronic device 1201. According to an embodiment, though not shown, the power management module 1295 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1296 and voltage, current, or temperature thereof while the battery 1296 is charged. The battery 1296 may include, for example, a rechargeable battery or a solar battery.

The indicator 1297 may display a specific state of the electronic device 1201 or part (e.g., the processor 1210) thereof, for example, a booting state, a message state, or a charging state, and the like. The motor 1298 may convert an electric signal into mechanical vibration and may generate vibration or a haptic effect, and the like. Though not shown, the electronic device 1201 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various example embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 13:
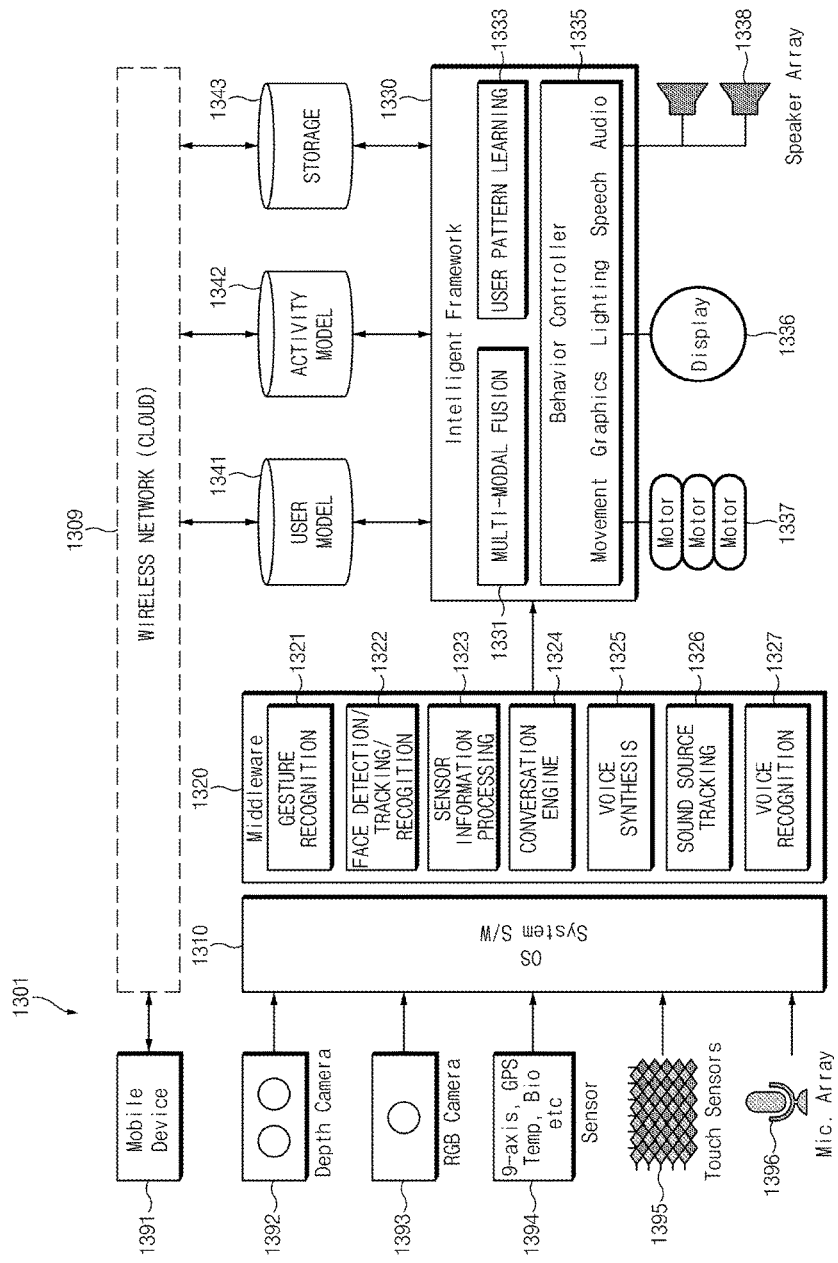
FIG. 13 is a block diagram illustrating example software components of an electronic device according to an example embodiment.

FIG. 13 is a block diagram illustrating example software components of an electronic device according to an example embodiment.

Referring to FIG. 13, an operating system (OS) system software (S/W) block 1310 of an electronic device 1301 may play a role as a general OS of distributing resources and processing a job scheduling process and may simultaneously play a role in controlling various H/W devices (e.g., cameras 1392 and 1393, sensors 1394 and 1395, a microphone 1396, and the like) and processing signals input from the hardware devices. A middleware block 1321 may play a role in detecting and tracking a face location of a user of the electronic device 1301 using the processed data, performing authentication through face recognition, recognizing a three-dimensional (3D) gesture of the user, performing a direct of arrival (DOA) for an audio signal, performing voice recognition, and processing data of various sensors. The middleware block 1321 may include a gesture recognition block 1321, a face detection/tracking/recognition block 1322, a sensor information processing block 1323, a conversation engine block 1324, a voice synthesis block 1325, a sound source tracking block 1326, a voice recognition block 1327, and the like, but is not limited thereto.

An intelligent framework 1330 may include a multi-modal fusion block 1331, a user pattern learning block 1333, and a behavior controller 1335. The multi-modal fusion block 1331 may play a role in collecting and managing a variety of information processed by the middleware block 1321. The user pattern learning block 1333 may play a role in extracting and learning meaningful information such as a life pattern and preference of the user using information of the multi-modal fusion block 1331. The behavior control block 1335 may play a role in representing information to be fed back to the user by the electronic device 1301 as movement of the electronic device 1301, graphics (e.g., a user interface (UI) and a user experience (UX)), lighting, a speech response, audio, and the like. In this regard, the intelligent framework 1330 may connect with a motor 1337, a display 1336, and a speaker 1338. The intelligent framework 1330 may further include a user model database 1341 for storing learned information for each user, a behavior model database 1342 for controlling behavior of the electronic device 1301, and a storage 1343 for storing other information. The corresponding databases may be stored and shared over a network (cloud) 1309. The network 1309 may connect with a mobile device 1391.

Figure 14:
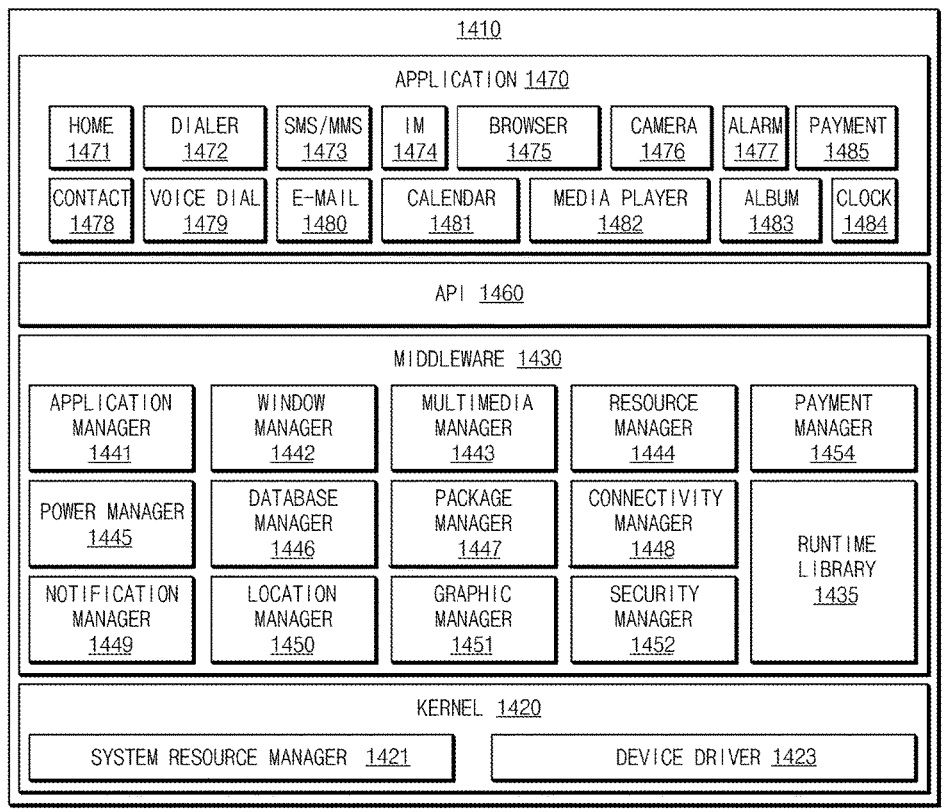
FIG. 14 is a block diagram illustrating an example configuration of a program module according to various example embodiments.

FIG. 14 is a block diagram illustrating an example configuration of a program module according to various example embodiments.

Referring to FIG. 14, according to an embodiment, a program module 1414 (e.g., a program) may include an OS of controlling resources associated with the electronic device described above and/or various applications (e.g., application programs) executed on the OS. The OS may be, for example, Android, iOS, Windows, Symbian, Tizen, Bada, or the like.

The program module 1410 may include a kernel 1420, a middleware 1430, an application programming interface (API) 1460, and/or an application 1470. At least part of the program module 1410 may be preloaded on the electronic device, or may be downloaded from an external electronic device (e.g., a external electronic device 200 and the like of FIG. 1).

The kernel 1420 may include, for example, a system resource manager 1421 and/or a device driver 1423. The system resource manager 1421 may control, assign, or collect, and the like system resources. According to an embodiment, the system resource manager 1421 may include a process management unit, a memory management unit, or a file system management unit, and the like. The device driver 1423 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1430 may provide, for example, functions the application 1470 needs in common, and may provide various functions to the application 1470 through the API 1460 such that the application 1470 efficiently uses limited system resources in the electronic device. According to an example embodiment, the middleware 1430 (e.g., the middleware) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, a security manager 1452, or a payment manager 1454.

The runtime library 1435 may include, for example, a library module used by a compiler to add a new function through a programming language while the application 1470 is executed. The runtime library 1435 may perform a function about input and output management, memory management, or an arithmetic function.

The application manager 1441 may manage, for example, a life cycle of at least one of the application 1470. The window manager 1442 may manage graphic user interface (GUI) resources used on a screen of the electronic device. The multimedia manager 1443 may determine a format utilized for reproducing various media files and may encode or decode a media file using a codec corresponding to the corresponding format. The resource manager 1444 may manage source codes of at least one of the application 1470, and may manage resources of a memory or a storage space, and the like.

The power manager 1445 may act together with, for example, a basic input/output system (BIOS) and the like, may manage a battery or a power source, and may provide power information utilized for an operation of the electronic device. The database manager 1446 may generate, search, or change a database to be used in at least one of the application 1470. The package manager 1447 may manage installation or update of an application distributed by a type of a package file.

The connectivity manager 1448 may manage, for example, wireless connection such as Wi-Fi connection or BT connection, and the like. The notification manager 1449 may display or notify events, such as an arrival message, an appointment, and proximity notification, by a method which is not disturbed to the user. The location manager 1450 may manage location information of the electronic device. The graphic manager 1451 may manage a graphic effect to be provided to the user or a user interface (UI) related to the graphic effect. The security manager 1452 may provide all security functions utilized for system security or user authentication, and the like. According to an embodiment, when the electronic device (e.g., an electronic device 100 or 101 of FIG. 1 or 1) has a phone function, the middleware 1430 may further include a telephony manager (not shown) for managing a voice or video communication function of the electronic device.

The middleware 1430 may include a middleware module which configures combinations of various functions of the above-described components. The middleware 1430 may provide a module which specializes according to kinds of OSs to provide a differentiated function. Also, the middleware 1430 may dynamically delete some of old components or may add new components.

The API 1460 may be, for example, a set of API programming functions, and may be provided with different components according to OSs. For example, in case of Android or iOS, one API set may be provided according to platforms. In case of Tizen, two or more API sets may be provided according to platforms.

The application 1470 may include one or more of, for example, a home application 1471, a dialer application 1472, a short message service/multimedia message service (SMS/MMS) application 1473, an instant message (IM) application 1474, a browser application 1475, a camera application 1476, an alarm application 1477, a contact application 1478, a voice dial application 1479, an e-mail application 1480, a calendar application 1481, a media player application 1482, an album application 1483, a clock application 1484, a payment application 1485, a health care application (e.g., an application for measuring quantity of exercise or blood sugar, and the like) (not shown), or an environment information application (e.g., an application for providing atmospheric pressure information, humidity information, or temperature information, and the like) (not shown), and the like.

According to an example embodiment, the application 1470 may include an application (hereinafter, for better understanding and ease of description, referred to as "information exchange application") for exchanging information between the electronic device (e.g., the electronic device 100 of FIG. 1) and an external electronic device (e.g., the external electronic device 200). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the external electronic device 200). Also, the notification relay application may receive, for example, notification information from the external electronic device, and may provide the received notification information to the user.

According to an embodiment, an application 1470 may include an application (hereinafter, for better understanding and ease of description, referred to as an "information exchange application") for exchanging information between the electronic device and an external electronic device. The information exchange application may include, for example, a notification relay application for transmitting specific information to the external electronic device or a device management application for managing the external electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the external electronic device 200) which communicates with the electronic device, an application which operates in the external electronic device, or a service (e.g., a call service or a message service) provided from the external electronic device.

According to an embodiment, the application 1470 may include an application (e.g., the health card application of a mobile medical device) which is preset according to attributes of the external electronic device (e.g., the external electronic device 200). According to an embodiment, the application 1470 may include an application received from the external electronic device (e.g., the server, the external electronic device 200). According to an embodiment, the application 1470 may include a preloaded application or a third party application which may be downloaded from a server. Names of the components of the program module 1410 according to various embodiments of the present disclosure may differ according to kinds of OSs.

According to various embodiments, at least part of the program module 1410 may be implemented with software, firmware, hardware (e.g., circuitry), or at least two or more combinations thereof. At least part of the program module 1410 may be implemented (e.g., executed) by, for example, a processor (e.g., a processor 120 of FIG. 1). At least part of the program module 1410 may include, for example, a module, a program, a routine, sets of instructions, or a process, and the like for performing one or more functions.

Figure 15:
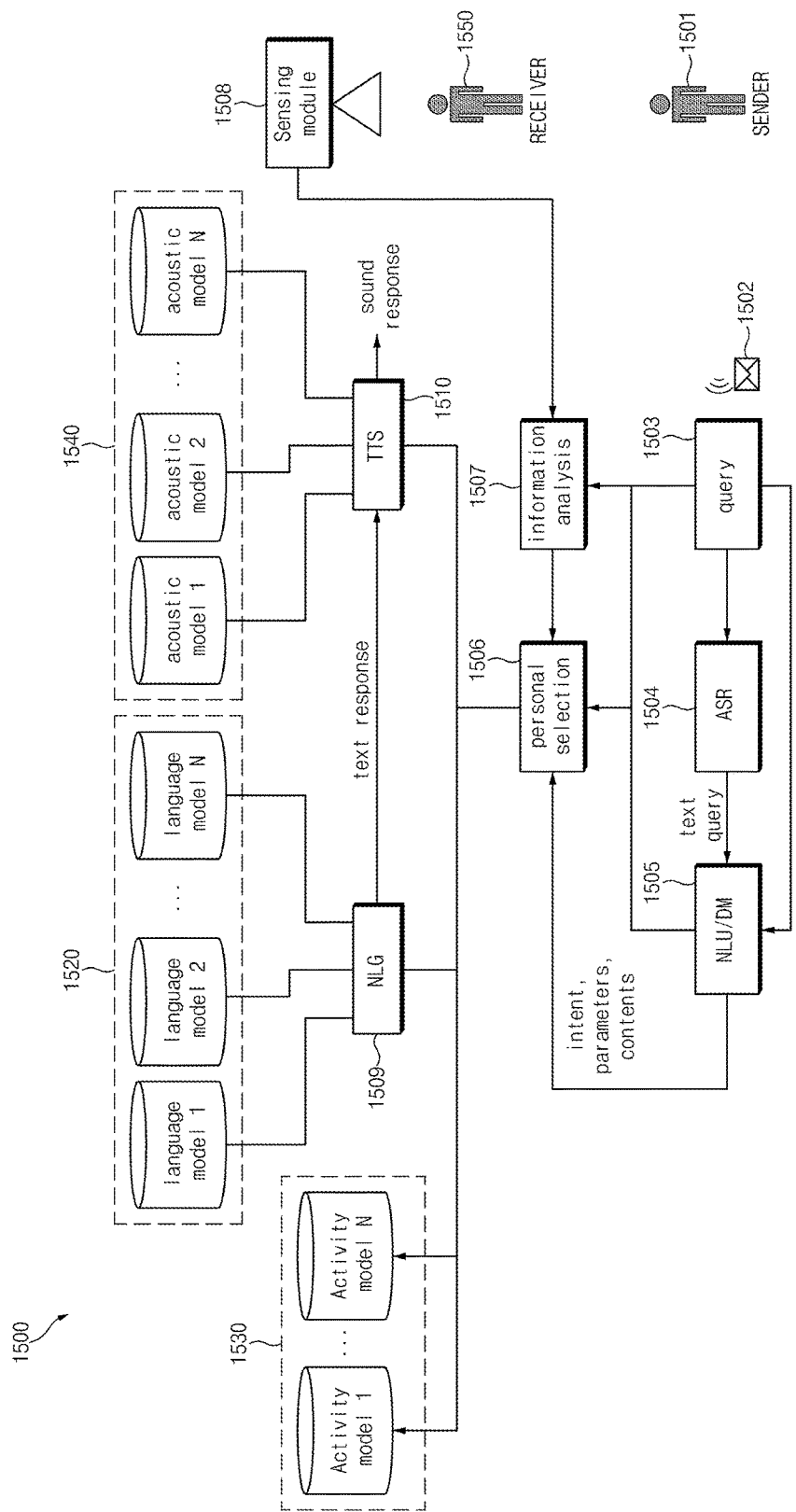
FIG. 15 is a diagram illustrating example voice recognition and output of an electronic device according to an example embodiment.

FIG. 15 is a diagram illustrating example voice recognition and output of an electronic device according to an example embodiment.

Referring to FIG. 15, an electronic device 1500 may receive a message 1502 from a sender 1501. The electronic device 1500 may provide a query 1503 about the message 1502 with a voice and may perform acoustic speech recognition (ASR) 1504. Alternatively, the electronic device 1500 may provide a query 1503 about metadata of the message 1502 and may perform information analysis 1507. For example, the electronic device 1500 may determine the receiver 1550 using information collected by performing the information analysis 1507 via a sensing module 1508. The electronic device 1500 may use information about the receiver 1550 for personal selection 1506.

The electronic device 1500 may obtain text as a result of performing the ASR 1504 and may provide the text as a query to perform natural language understanding/dialog management (NLU/DM) 1505. Herein, the electronic device 1500 may recognize text as a sentence through the NLU/DM 1505. The electronic device 1500 may use at least one of intent, a parameter, and content obtained through the NLU/DM 1505 for the personal selection 1506. The electronic device 1500 may use the query 1503 of the message 1502 itself for the personal selection 1506.

The electronic device 1500 may select one of at least one language model 1520 via a natural language generator (NLG) 1509 based on the selected attributes. For example, the electronic device 1500 may determine at least one text generation variable.

The electronic device 1500 may select one of at least one activity model 1530 based on the selected attributes. For example, the electronic device 1500 may at least one activity variable.

The electronic device 1500 may select one of at least one acoustic model 1540 based on the selected attributes. For example, the electronic device 1500 may determine at least one voice generation variable to output a message converted into text via the NLG 1509. The electronic device 1500 may output a sound response based on the selected acoustic model. The electronic device 1500 may perform sound synthesis 1510 (e.g., TTS) to output a sound response.

As described above, the electronic device 1500 may change a factor on the NLG 1509 and the TTS module based on a relationship between one or more entities or contents to be transmitted and may provide a dynamic result to a user who performs interaction.

In a process of the personal selection 1506, the electronic device 1500 may use a sensor, connectivity, personal profile data, and the like for a vision, a voice, and the like for identifying at least one user and environment as well as content of a message to be transmitted. In case of the language mode 1520, another language model may be determined based on the receiver 1550 and the electronic device 1500. For example, if a relationship between the receiver 1550 and the electronic device 1500 is set to a friend by a previous setting or learning, a language model for composing a word and a sentence indicating friendliness may be selected. An acoustic model having a characteristic of a fast clear tone may be selected for an urgent message based on a message which should be sent to a user of the electronic device 1500 to perform language conversion. In another embodiment, the electronic device 1500 may modulate an acoustic model of a voice of a high frequency band into an acoustic model of a voice of a low frequency band based on information in which the receiver 1550 is weak in listening to the voice of the high frequency band.

The above-mentioned robot electronic device may perform a process of determining whether a QA result in progress through a process of analyzing a received voice question is a short answer or a sequential answer. If determining that the QA result is not the short answer, the robot electronic device may determine a suitable answer scheme to the QA result. For example, the robot electronic device may send a QR code to a portable device through wireless-fidelity (Wi-Fi), Bluetooth (BT), a sound QR using a WIKI URL/related URL or may send a screen in the form of being output. Alternatively, the robot electronic device may convert a JavaScript object notation (JSON)-type answer into a file (e.g., a DOC file, a JPG file, a PDF file, or the like) of a form which may be output and may send the file to the portable device.

According to various example embodiments, in a computer-readable storage medium of a program, at least one instruction may be stored in the computer-readable storage medium. When executed by a processor, the at least one instruction may be configured to obtain a voice signal corresponding to a user, to obtain context information associated with the user in connection with obtaining the voice signal, to determine whether the context information meets a first specified condition or a second specified condition, and to output at least part of first answer information corresponding to the voice signal if the context information meets the first specified condition and to output at least part of second answer information corresponding to the voice signal if the context information meets the second specified condition.

According to various example embodiments, in a computer-readable storage medium of a program, at least one instruction may be stored in the computer-readable storage medium. When executed by a processor, the at least one instruction may be configured to collect a user voice signal, to convert the collected voice signal into text, to search for an answer corresponding to the converted text or an answer corresponding to the question based on data stored in a memory of an electronic device, to collect attributes information of the found question or answer, to generate additional information based on the answer and the attributes information, and to output at least one of the answer or the additional information.

According to various example embodiments, the electronic device may output various forms of answers adaptive to a user question.

The terminology "module" used herein may refer, for example, to a unit including one of hardware (e.g., circuitry), software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of processing circuitry, an application-specific integrated circuit (ASIC) chip, field-programmable gate arrays (FPGAs), or a programmable-logic device, which is well known or will be developed in the future, for performing certain operations.

According to various example embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various example embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and illustrated in the drawings are provided as examples to describe technical content and help understanding but do not limit the present disclosure. Accordingly, it should be understood that besides the example embodiments listed herein, all modifications or modified forms derived based on the technical ideas of the present disclosure are included in the present disclosure as defined in the claims, and their equivalents.

The above-described example embodiments of the present disclosure can be implemented in hardware (e.g., circuitry), firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer.

What is claimed is:
1. An electronic device, comprising:
   an audio circuitry;
   an image sensor;
   a memory configured to store at least one question and at least one time-series answer corresponding to the at least one question, wherein the at least one time-series answer comprises a first answer and a second answer, the first answer being configured to be output before the second answer is to be output; and at least one processor, coupled with the audio circuitry, the image sensor, and the memory, the at least one processor configured to:
generate a text by converting a voice signal received from the audio circuitry, the voice signal corresponding to a user's voice;
obtain, via the memory, a question corresponding to the generated text and a time-series answer corresponding to the question, the time-series answer comprising the first answer and the second answer;
output the first answer of the obtained time-time series answer;
in response to a user gesture corresponding to a word in the first answer of the obtained time-series answer, output the second answer, wherein the user gesture is obtained via at least one of the image sensor or the audio circuitry.

2. The electronic device of claim 1, wherein the at least one processor is configured to:
obtain an image using the image sensor and attributes information of the obtained question and the time-series answer;
generate additional information based on each of the time-series answer, the image of a face of the user, and the attributes information; and
output at least one of the time-series answer and the additional information, if a result of analyzing the obtained image from the image sensor meets a condition.

3. The electronic device of claim 2, wherein the at least one processor is configured to: convert the additional information into a voice signal; and output the converted voice signal.

4. The electronic device of claim 3, wherein the at least one processor is configured to: output the additional information which is not converted into a voice signal on a screen of the electronic device.

5. The electronic device of claim 2, wherein the at least one processor is configured to: output address information on a screen of the electronic device, the output address information corresponding to a storage location at which the additional information is stored.

6. The electronic device of claim 1, wherein the at least one processor is configured to:
wait for outputting the second answer before the user gesture is detected.

7. The electronic device of claim 6, wherein the at least one processor is configured to: output an answer to another question, if the another question is received before the user gesture is collected.

8. A question and answer (QA) processing method of an electronic device, the method comprising:
obtaining a voice signal in the electronic device from a user of the electronic device;
generating a text by converting the obtained voice signal;
obtaining a question corresponding to the generated text and a time-series answer corresponding to the question, the time-series answer comprising a first answer and a second answer based on data stored in a memory operatively connected with the electronic device;
in response to a user gesture corresponding to a word in the first answer of the obtained time-series answer, outputting the second answer following the first answer, wherein the user gesture is obtained via at least one of image sensor or audio circuitry.

9. The method of claim 8, further comprising:
obtaining an image using an image sensor of the electronic device and attributes information of the question and the time-series answer;
generating additional information based on the time-series answer, the image of a face of the user, and the attributes information; and
outputting at least one of the time-series answer and the additional information, if a result of analyzing the obtained image meets a condition.

10. The method of claim 9, wherein the outputting of the at least one of the time-series answer and the additional information comprises:
outputting information which is not converted into a voice signal among the additional information on a screen of the electronic device; and
outputting address information corresponding to a storage location at which the additional information is stored, on the screen of the electronic device.

11. The method of claim 9, wherein the outputting of the at least one of the time-series answer and the additional information comprises:
converting the additional information into a voice signal and outputting the converted voice signal, if a result of analyzing the obtained image meets a condition.

12. The method of claim 9, wherein the outputting of the at least one of the time-series answer and the additional information comprises:
outputting at least part of the first answer and waiting for outputting the second answer before the condition is met; and
outputting the second answer, if the condition is met.

13. The method of claim 12, further comprising:
outputting an answer to another question, if the another question is received before the condition is met.

* * * * *